United States Patent
Ingram

(10) Patent No.: US 10,264,343 B2
(45) Date of Patent: Apr. 16, 2019

(54) MOBILE DEVICE STORAGE AND CHARGING APPARATUS

(71) Applicant: Quip Technologies Inc., Venice, CA (US)

(72) Inventor: Matthew Callam Ingram, Venice, CA (US)

(73) Assignee: Quip Technologies Inc., Venice, CA (US)

( * ) Notice: Subject to any disclaimer, the term of this patent is extended or adjusted under 35 U.S.C. 154(b) by 0 days.

(21) Appl. No.: 15/910,511

(22) Filed: Mar. 2, 2018

(65) Prior Publication Data

US 2018/0262826 A1 Sep. 13, 2018

Related U.S. Application Data

(60) Provisional application No. 62/469,639, filed on Mar. 10, 2017, provisional application No. 62/552,131, filed on Aug. 30, 2017.

(51) Int. Cl.
- *H04R 1/10* (2006.01)
- *H04B 1/3883* (2015.01)
- *H04B 1/3888* (2015.01)

(52) U.S. Cl.
CPC ......... *H04R 1/1025* (2013.01); *H04B 1/3883* (2013.01); *H04B 1/3888* (2013.01); *H04R 1/1016* (2013.01); *H04R 1/1041* (2013.01); *H04R 2420/07* (2013.01); *H04R 2420/09* (2013.01)

(58) Field of Classification Search
CPC .. H04R 1/1025; H04R 1/1016; H04B 1/3883; H04B 1/3888
See application file for complete search history.

(56) References Cited

U.S. PATENT DOCUMENTS

| | | | | |
|---|---|---|---|---|
| 2009/0017881 A1* | 1/2009 | Madrigal | ............ | H04M 1/0258 455/575.1 |
| 2013/0148839 A1* | 6/2013 | Stevinson | ............ | H04R 1/1033 381/384 |
| 2013/0265702 A1* | 10/2013 | Merenda | ................ | B65H 75/48 361/679.01 |
| 2015/0245126 A1* | 8/2015 | Shaffer | ................ | H04R 1/1025 381/74 |
| 2015/0245127 A1* | 8/2015 | Shaffer | ................ | H04R 1/1025 381/380 |
| 2016/0173160 A1* | 6/2016 | Gronewoller | ........ | H04B 1/3888 455/575.8 |
| 2017/0215293 A1* | 7/2017 | Merenda | ............. | H05K 5/0217 |

(Continued)

*Primary Examiner* — Simon King
(74) *Attorney, Agent, or Firm* — Kim Winston LLP

(57) ABSTRACT

There is provided a mobile device case for carrying and charging a mobile device and at least one earbud. The case includes a main body having a mobile device cavity for receiving the mobile device and at least one earbud cavity for receiving the at least one earbud; a rechargeable battery pack in the main body; a mobile device interface connected to the cavity, the mobile device interface operatively connected to the battery pack and operable to supply power to the mobile device; and at least one earbud interface disposed within the at least one earbud cavity, the earbud interface operatively connected to the battery pack and operable to supply power to the respective earbud stored in the earbud cavity to charge the earbud.

23 Claims, 22 Drawing Sheets

(56) References Cited

U.S. PATENT DOCUMENTS

| | | | | |
|---|---|---|---|---|
| 2017/0231345 A1* | 8/2017 | Gronewoller | .......... | A45C 11/00 |
| | | | | 455/575.8 |
| 2017/0318928 A1* | 11/2017 | Gronewoller | .......... | A45C 11/00 |
| 2017/0339482 A1* | 11/2017 | Schrems | ............... | G06F 1/1626 |
| 2018/0067712 A1* | 3/2018 | Behzadi | ..................... | G06F 3/14 |
| 2018/0091884 A1* | 3/2018 | Minoo | ................. | H04R 1/1025 |
| 2018/0115816 A1* | 4/2018 | Panecki | ................. | A45C 13/02 |
| 2018/0124491 A1* | 5/2018 | Dragicevic | .......... | H04R 1/1016 |
| 2018/0146275 A1* | 5/2018 | Forstner | ................. | H04R 1/028 |

* cited by examiner

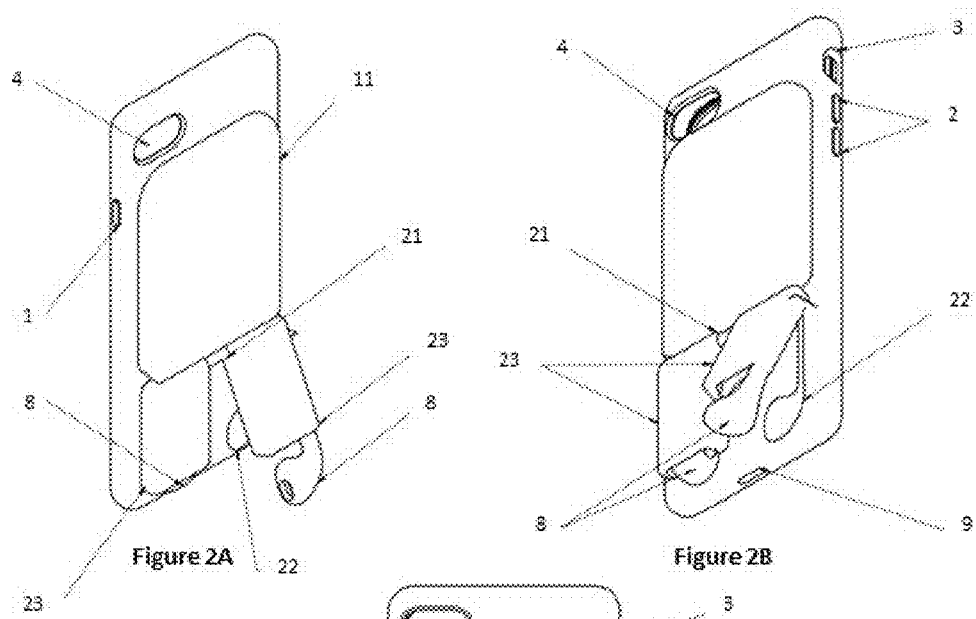
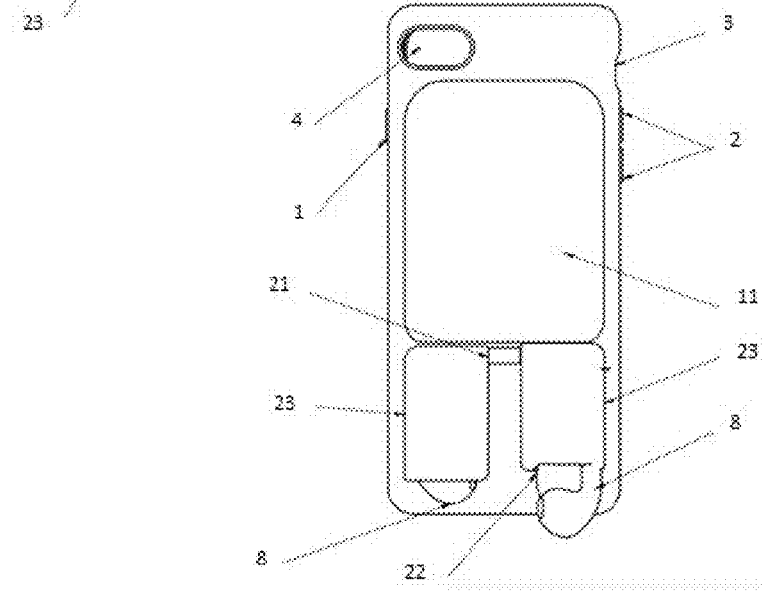

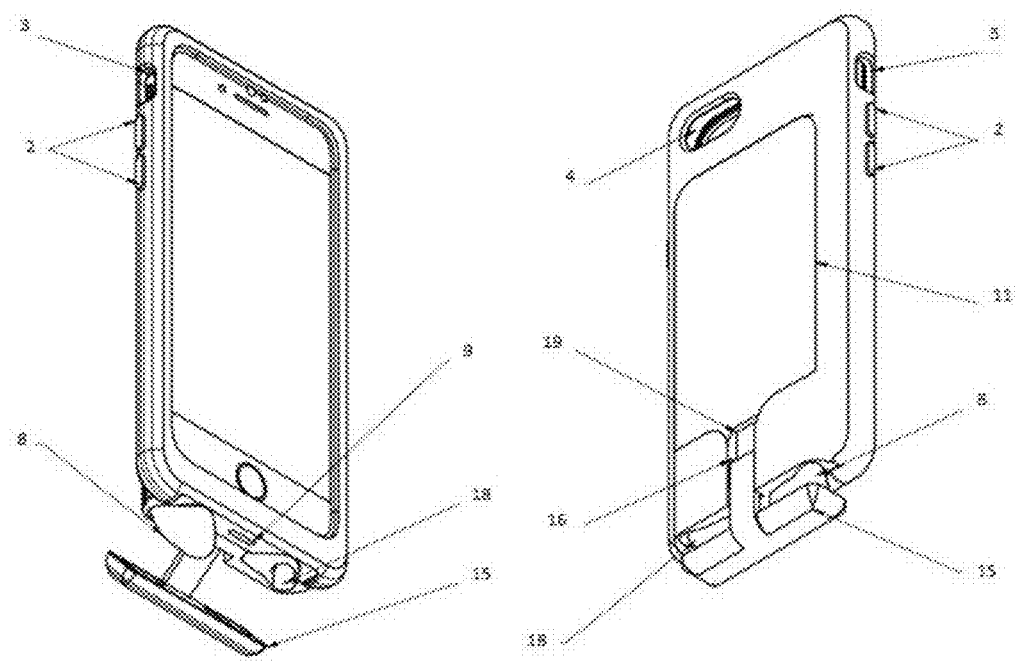

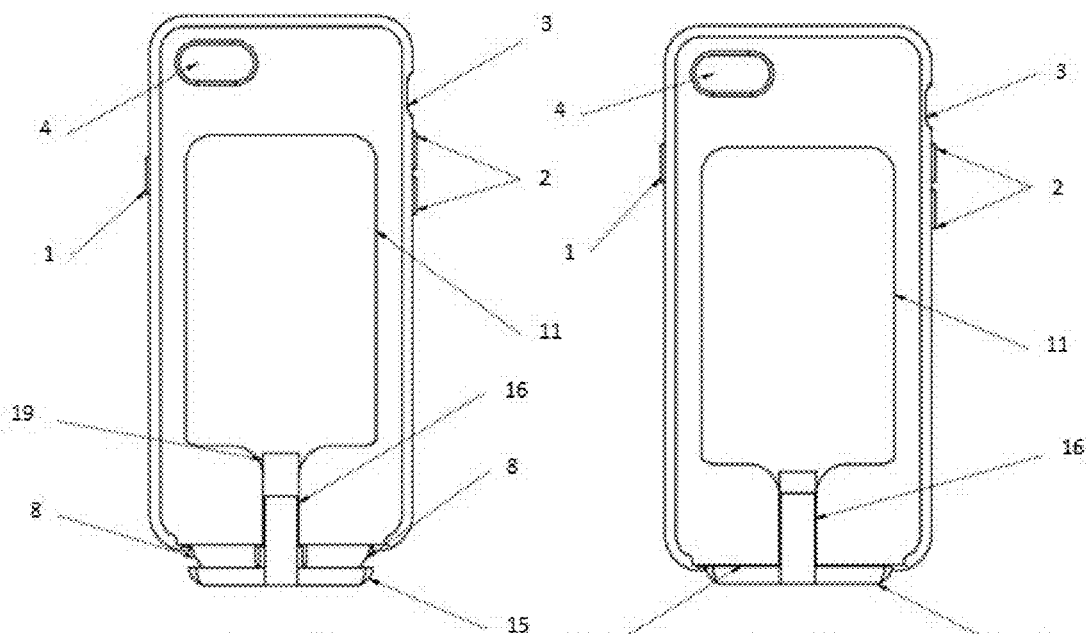
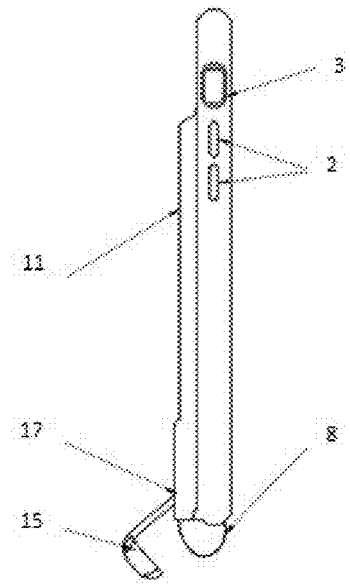
Figure 4A   Figure 4B
Figure 4C

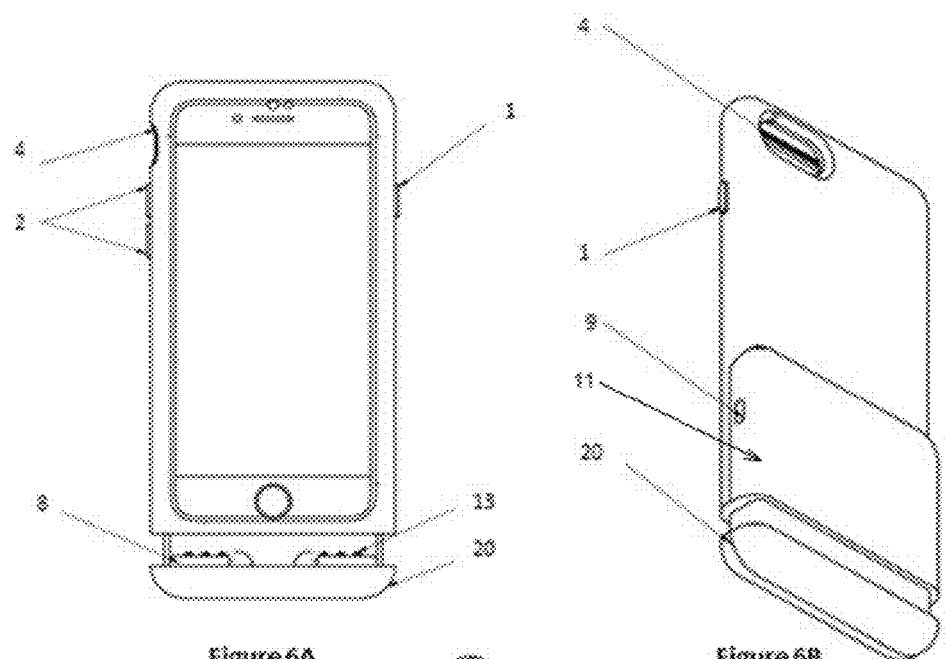
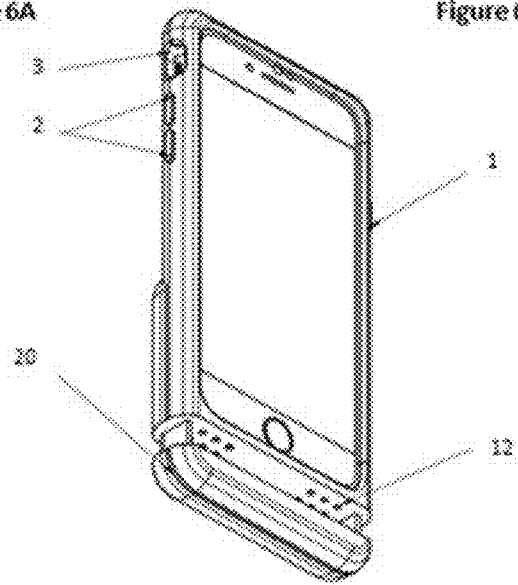
Figure 6A
Figure 6B
Figure 6C

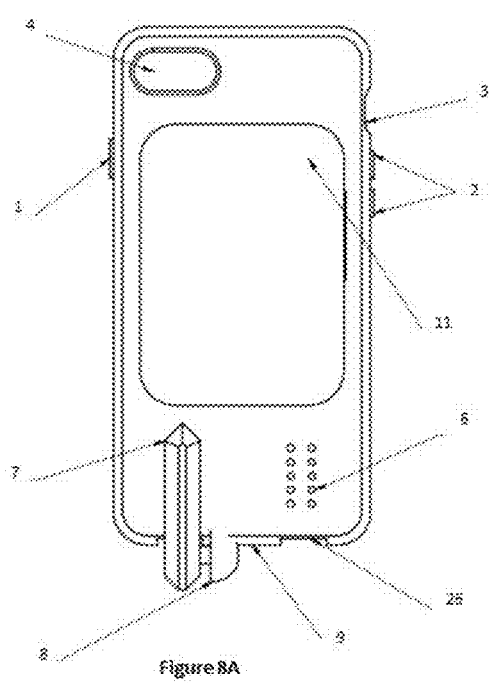 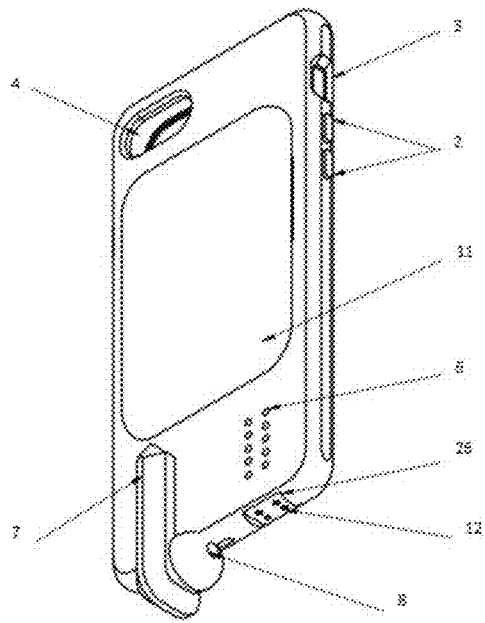
Figure 8A
Figure 8B
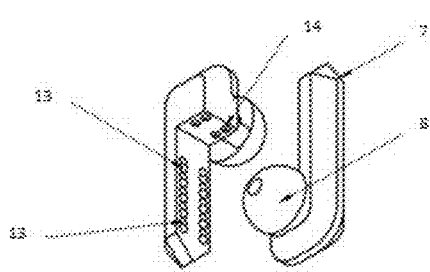 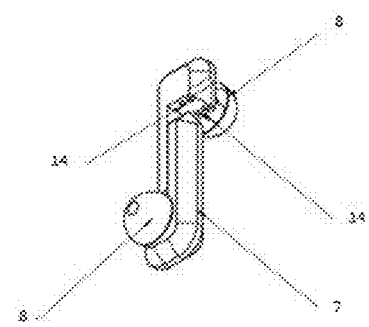
Figure 9A
Figure 9B

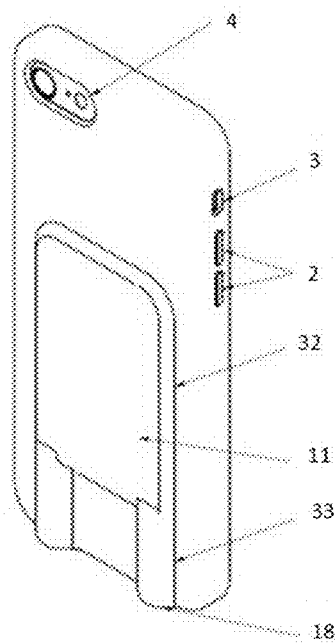
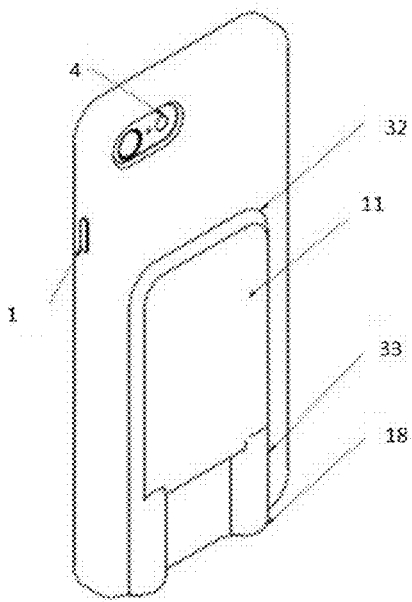
Figure 14A                Figure 14B
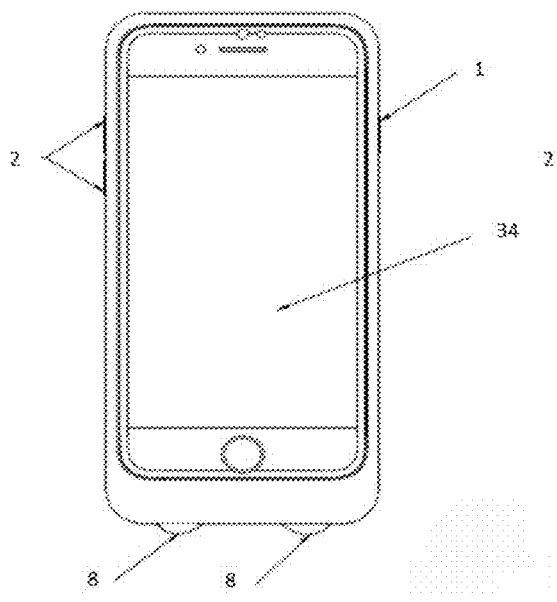
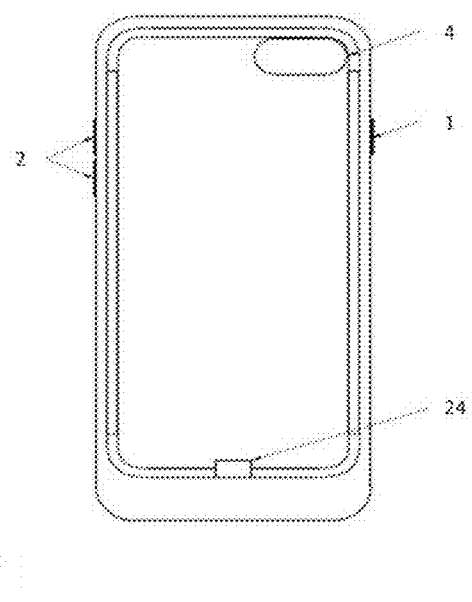
Figure 15A                Figure 15B

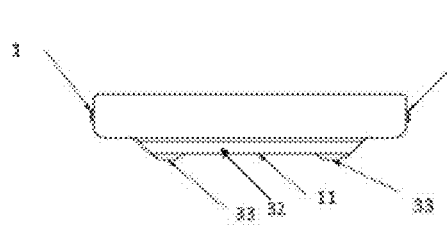
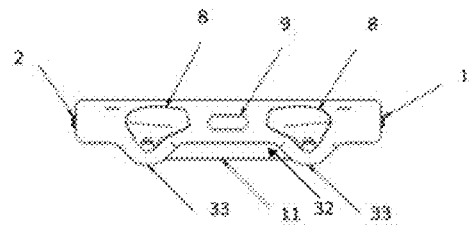
Figure 16A     Figure 16B
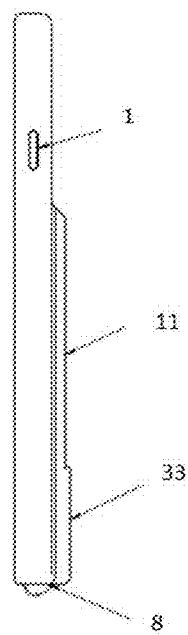
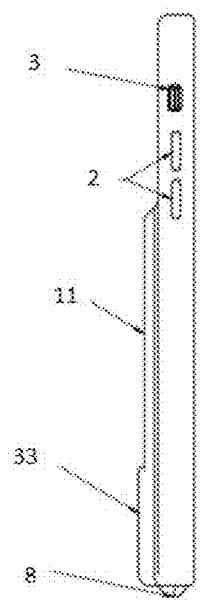
Figure 17A     Figure 17B

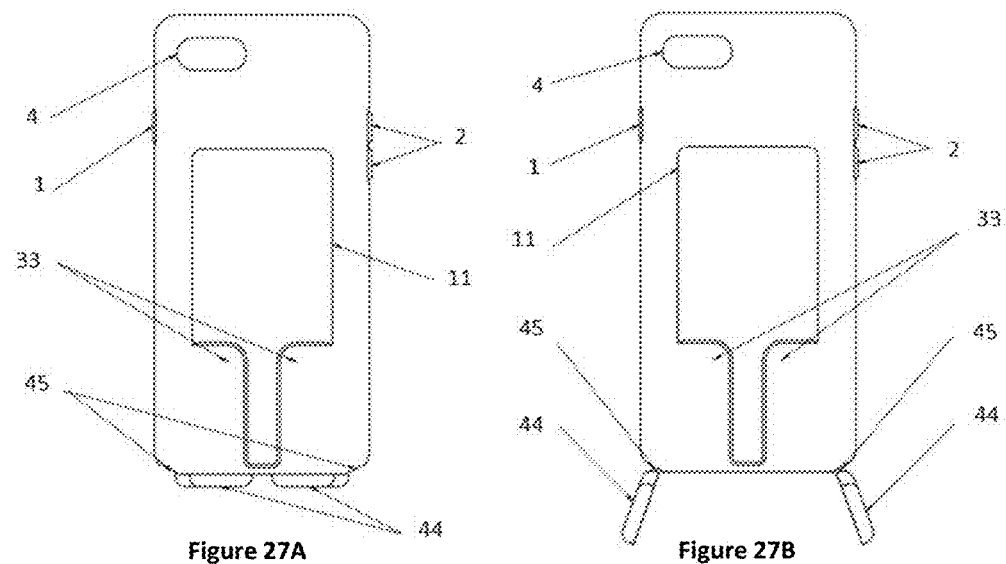
Figure 27A
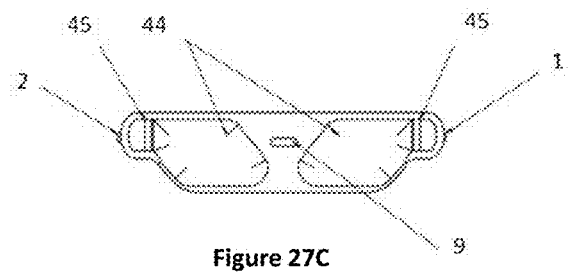
Figure 27B
Figure 27C

MOBILE DEVICE STORAGE AND CHARGING APPARATUS This is a U.S. non-provisional patent application claiming priority to U.S. Provisional Patent Application Ser. Nos. 62/469,639, filed Mar. 10, 2017, and 62/552,131, filed Aug. 30, 2017, each of which is hereby incorporated herein by reference in its entirety.

FIELD OF INVENTION

This present disclosure relates generally to mobile phone accessories, and more particularly to an apparatus operable as a reserve battery and storage device for wireless earbuds and a mobile device.

BACKGROUND

Mobile devices are commonly used for listening to music or radio broadcasts, and receiving voice communications from other devices (e.g., mobile devices, computers, telephones etc.). Earphones (also known as headphones) enable the user to listen or communicate with the mobile device hands-free. Some earphones are designed as wireless audio earbuds ("earbuds") and allow the user to use the mobile device hands-free without the annoyance of easily tangled and damaged wires. Some newer mobile device models do not include an auxiliary jack to plug in earphones. Therefore, earphones are required to be connected through Bluetooth® or an auxiliary adapter that must be attached through the mobile device's electrical power port to accommodate wired earphones. The earbuds are typically carried separate from the mobile phone, in their own or in a storage case. Many models of earbuds are not tethered to one another and are easily lost or misplaced. Thus, it can be difficult or inconvenient to both charge and store the earbuds to prevent damage and loss. In addition, wireless earbuds contain their own power source, such as a rechargeable battery, and thus require users to carry an external charger, storage device, or dedicated plug-in charging device for their earbuds.

Therefore, there is a need to provide a convenient storage place for the earbuds to prevent damage, loss and provide a source of power to facilitate the charging of the earbuds. Since the earbuds are intended to be used in association with a mobile device, there is also a need to provide the user with a storage place for the earbuds directly within the mobile device.

SUMMARY OF THE DISCLOSURE

In general, the present specification describes a case or other attachments for a mobile device that provides a battery pack for charging of wireless earbuds and/or the mobile device. Also described herein is a mobile device case that can be used to provide storage for untethered earbuds.

According to one aspect of the present disclosure, there is provided a case for a mobile device and one or more earbuds comprising of a casing, one or more rechargeable power cells, and one or more earbud slots.

In some embodiments, the casing may define a cavity that conforms, at least partially, to the outer shape of the mobile device and earbuds. In some embodiments, the casing may further define one or more apertures to permit access to integrated interfaces (e.g., electrical power plug-in, camera lens, audio jack, etc.) of the mobile device. In some embodiments, the casing may secure the mobile device within the cavity while at least one surface of the mobile device, such as the screen, remains at least partially exposed. The casing may be comprised of a material that protects the mobile device and earbuds housed in the casing, at least partially, from contact with another object (for example, the floor when the mobile decide is dropped on the ground).

In some embodiments, the one or more rechargeable power cells may be housed in back panel of the case. In some embodiments, the power cells may be housed in a protrusion on a back panel of the case. In some embodiments, the one or more rechargeable power cells may be enclosed in a battery pack and made detachable from the case, allowing selective removal from and reattachment to the case. The detachable battery pack may be held in place on the case by pins and/or rails so that the battery back is both electrically and mechanically secured to the case.

In some embodiments, one or more earbud slots may be housed in a protrusion on the back panel of the case. Each earbud may enter the associated earbud slot through the corresponding apertures. The earbud slot may include an internal interface on the earbud to provide a conductive or, in some embodiments, an inductive electrical charge from the one or more rechargeable power cells to the earbud. A mobile device interface of the case may be electrically coupled to the earbud interface in order to receive a conductive or, in some embodiments, an inductive electrical charge from an external device to the one or more rechargeable power cells to recharge.

In some embodiments, the one or more apertures on the case are preferably designed to receive an earbud in a slot that would conform to the shape of the earbud. The earbud may be held in place in the slot by friction.

In some embodiments, the earbud may be held in place in the slot by a spring mechanism that releases the earbuds by the pressing of a button associated with a release mechanism. More precisely, when the earbud is inserted into the slot, it preferably compresses a spring, which is then restrained by a button mechanism. The button, when pushed, releases the spring, which then will thrust the earbud out of the slot.

In some embodiments, the earbud may be held in place in the sheath by an electromagnet that secures the earbud in the slot. The slot can release the earbud by a switch or button that reverses polarity and repels the earbud, pushing it out of the slot.

In some embodiments, the earbud may be held in place in the slot using a sliding mechanism that pushes the earbud into and out of the case.

In some embodiments, the earbud could be held in place using one or more enclosures that extends from the base of the mobile device case that opens and closes via a hinge and/or a magnetic mechanism. The hinge may be located on the front, back or side of the mobile device case. The earbud slot openings may be covered by one or more enclosures that may be overlapping and held in place using one or more magnets or other structure that may allow for each earbud to be separately secured in the mobile device case. In some embodiments, the earbuds can be held on the external surface of the mobile device case, secured to the case via magnets. In some embodiments, these earbud may be held in place and released with any combination of the above specifications or as further described as herein.

In some embodiments, the mobile device case may include an additional internal interface and/or an external interface. The case's internal interface may engage a corresponding interface on the mobile device to provide an inductive or conductive electrical charge from the one or more rechargeable cells to the mobile device. The case's external interface may be electrically coupled to the internal interface in order to transmit an inductive or conductive charge from the mobile device to an external device. The external interface may further serve to receive an inductive or conductive electrical charge from an external power source (e.g., a power outlet) to deliver charge to one or more rechargeable cells within the mobile device case or within the mobile device.

In some embodiments, the case may be capable of wirelessly charging the one or more rechargeable power cells housed in the battery pack in a protrusion on the back panel of the case. This may include an inductive electrical charging system that requires no physical attachment and can charge on contact (e.g., a charging mat) or at a distance.

In some embodiments, the casing may comprise a conductive charging device through a cord that charges the one or more rechargeable power cells. This may include charging by a suitable cable such as a USB type c (USB-C) port, micro USB, or Apple™ lightning Port™ (with permission obtained from Apple™), or the like.

In some embodiment, the case includes a battery pack, and the battery pack will be capable of receiving charge while a mobile device and one or more earbud is mounted within the cavity.

In some embodiments, the case may include Bluetooth® technology that communicates with the mobile device through an interface that allows transmission of audio through the Bluetooth® connection between the case and the earbuds. This transmission will be facilitated by the case's physical connection to the mobile device via the mobile device's charging port or a similar interface.

In some embodiments, the case may contain one or more switches that control the charging of the mobile device and one or more earbuds. This control is intended to allow the mobile device and earbuds to be housed inside the cavity of the casing without receiving an electrical charge, or allow the user to control the priority of charge (e.g., specify that earbuds must be fully charged before delivering charge to the mobile device). In some embodiment, the switches comprise electronically-controlled switches, and in further embodiments, the mobile device includes software for controlling such switches, and an electronic interface between the mobile device and the case enables the mobile device to send signals controlling such switches.

In some embodiments, the case may also contain one or more speaker grills on the front or back of the case, or both. The grill will cover a speaker driver that can be integrated into the base of the case.

According to another aspect of the disclosure, the case is provided as a single unit comprising of a back panel, a left panel, a right panel, a top panel, and a base. The back, left, right, top panels and base may define a cavity for mounting the mobile device. The back panel and base may contain one or more slots for mounting earbuds, and one or more rechargeable power cells enclosed in a battery pack within the back panel or in a protrusion on the back panel.

According to another aspect of the disclosure, the case comprises multiple components, including a detachable top portion that may include a top, back, left and right sidewall. In this embodiment, the structure allows the mobile device to slide into the bottom portion of the case while the top portion encloses the mobile device, conforming to the device, at least partially, to secure it in the case. The back panel and base may contain a protrusion with one or more slots for mounting an earbud and a battery pack.

In some embodiments, this case can serve as a reserve power source for the mobile device. The reserve power source may serve to extend the operational life of the mobile device, lengthening the time between charges, and thus reducing the need to carry an external charger, storage device, or dedicated plug-in charging device for the mobile device.

In addition, in some embodiments, the case may also contain Bluetooth® capabilities to bridge the connection through the mobile device interface on the mobile device to the earbuds. Enabling the Bluetooth® feature on the mobile device allows transmission of data that can be used for tracking of mobile devices and their users and can be used as a platform for intruders to hack into the mobile device. The illustrated case presents an embodiment that allows users to turn the Bluetooth® feature on the mobile device off, and use the bridge of the case to connect the mobile device to the earbuds. This bridge would act as an added security feature to prevent intruders from gaining access to the information stored on the mobile device.

In addition, the case will be equipped to bridge a connection with devices that do not have Bluetooth® capabilities to connect to wireless earbuds. Some devices, such as laptops, or entertainment systems on airplanes, cannot use Bluetooth® to connect to the wireless earbuds. Some embodiments may contain an auxiliary port that allows a connection between a device without Bluetooth® capabilities and the mobile device case that bridges the connection of audio to the earbuds. In this embodiment, the case may have a female auxiliary jack that connects to the device using a cord with a double male auxiliary jack.

In some embodiments, the case may contain one or more switches that control the charging of the mobile device and one or more earbuds. This will allow the mobile device and earbuds to be housed inside the cavity of the casing without receiving an electrical charge, or allow the user to control the priority of charge (e.g. specify that earbuds must be fully charged before delivering charge to the mobile device.)

In some embodiments, the case may contain custom designed earbuds that can be stored on the mobile device case through any of the mechanisms listed above, and have magnetic capabilities that allow the earbuds to attach and be conveniently stored together.

In some embodiments, the apparatus may be a mobile device case with the capacity to store the earbuds within the cavity of the device. The earbuds may be stored by means of any of the methods as described above and in this disclosure (friction, magnetism, hinge, and the like).

According to another aspect of the present disclosure, there is provided a mobile device case for carrying and charging a mobile device and at least one earbud. The mobile device includes a main body having a mobile device cavity for receiving the mobile device and at least one earbud cavity for receiving the at least one earbud; a rechargeable battery pack in the main body; a mobile device interface connected to the cavity, the mobile device interface operatively connected to the battery pack and operable to supply power to the mobile device; and at least one earbud interface disposed within the at least one earbud cavity, the earbud interface operatively connected to the battery pack and operable to supply power to the respective earbud stored in the earbud cavity to charge the earbud.

In some embodiments, the main body further comprises a plurality of apertures to provide access to interfaces of the mobile device. In some embodiments, the at least one earbud is secured within the earbud cavity by magnetic attraction between each of the earbud and the earbud cavity, the magnetic attraction being reversible by actuation of a control switch that reverses a polarity of a magnetic field source in the slot to generate a repulsive force against at least one of the earbud.

In some embodiments, the at least one earbud is secured within the at least one earbud cavity by friction, each of the pair of earbuds being removable by manual extraction from its respective slot.

In some embodiments, the at least one earbud is secured within the at least one earbud cavity using a slider mechanism operable to push the earbud into and out of the at least one earbud cavity.

In some embodiments, the at least one earbud is secured within the earbud cavity by a compressed spring mechanism restrained by a control button, the compressible spring mechanism may release at least one of the secured earbud upon actuation of the control button that releases the compressed spring mechanism to a decompressed state.

In some embodiments, the at least one earbud is housed in a protrusion on the back panel of the mobile device case.

In some embodiments, the at least one earbud is housed in a sheath structure by an electromagnet that secures the at least one earbud in the at least one earbud cavity.

In some embodiments, the at least one earbud cavity is disposed at the base of the main body and the case comprises at least one enclosure extending from the base of the case positionable in an open and closed state to expose and cover the opening of the at least one earbud cavity.

In some embodiments, the at least one enclosure is attached to the main body with a hinge. In some embodiments, the at least one enclosure is attached to the main body with a magnetic attraction. In some embodiments, the cavity is defined by a back panel, left panel, right panel, top panel, and a base panel.

In some embodiments, the at least one earbud cavity is disposed on the back panel the main body.

In some embodiments, the battery pack supplies power to the mobile device through an electrical connection.

In some embodiments, the battery pack supplies power to the mobile device through inductive charging. In some embodiments, the battery pack supplies power to the at least one earbud through an electrical connection. In some embodiments, the battery pack supplies power to the at least one earbud through inductive charging.

In some embodiments, the main body includes an external power interface disposed outside of the cavity operable to receive electrical power from an external power source.

In some embodiments, the external power interface is electrically connected to at least one of the mobile device interface, the earbud interface, and the battery pack to supply power to such interface.

In some embodiments, the external power interface is operatively connected to at least one of the mobile device interface, the earbud interface, and the battery pack to supply power to such interface through induction.

In some embodiments, the mobile device case includes at least one switch operable to control distribution of electrical power to at least one of the mobile device interface and the earbud interface for charging the mobile device and at least one earbud.

In some embodiments, the main body includes at least one speaker grills, the speaker grills are configured to cover at least one audio speaker driver integrated into the main body of the phone case.

In some embodiments, the main body includes at least two main body portions combinable to form the main body. In some embodiments, the at least two main body portions include a top portion with a top, top-left, top-right and top-back sidewalls, the sidewalls forming a first section of the top, back, left and right panels of the main body; and a bottom portion with bottom-left, bottom-right, bottom-back and bottom sidewalls, the sidewalls forming a second section of the top, back, left and right panels of the main body, the mobile file being slidable into a partial cavity defined by the bottom portion and the first and second sections combinable to form the main body.

In some embodiments, the mobile device interface is further operable as a data interface and is operatively connectable to the mobile device for data communication with the mobile device; and the main body further comprises a wireless transceiver electrically connected to the mobile device through the mobile device interface to provide a wireless communication link between an external device and the mobile device case to facilitate data communication between the external device and the mobile device.

In some embodiments, the wireless transceiver is a Bluetooth transceiver and the external device is a pair of Bluetooth wireless earbuds.

In some embodiments, the mobile device interface is one of a USB type c interface, a micro USB interface and an Apple™ Lightning™ port.

In some embodiments, the mobile device case includes an auxiliary port connectable to an auxiliary device using an auxiliary cord; and a wireless transceiver electrically connected to the auxiliary device through auxiliary port to facilitate data communication between the auxiliary device and a wireless device wirelessly connected to the mobile device case.

Additional aspects of the present invention will be apparent in view of the description which follows.

BRIEF DESCRIPTION OF THE DRAWINGS

Features and advantages of the embodiments of the present invention will become apparent from the following detailed description, taken in combination with the appended drawings in which:

FIG. 2A illustrates an embodiment of a mobile device case with two earbud interface coverings that open on a hinge and a battery pack from a rear top left-angled view.

FIG. 2B illustrates a rear bottom right-angled view of a mobile device case shown in FIG. 2A.

FIG. 2C illustrates a rear view of a mobile device case shown in FIG. 2A.

FIG. 3A illustrates an alternative embodiment of a mobile device case with two slots within the cavity of the mobile device case, a covering, attached via hinge (open) and a battery pack from a front bottom left-angled view.

FIG. 3B illustrates a rear bottom right-angled view of a mobile device case shown in FIG. 3A with the earbuds inserted in slots and the covering in the closed position.

FIG. 4A illustrates a rear view of a mobile device case shown in FIG. 3A with the ear buds inserted in the slots and covering in the closed position.

FIG. 4B illustrates a rear view of a mobile device case shown in FIG. 3A with the ear buds removed and the covering in the closed position.

FIG. 4C illustrates a side view of a mobile device case shown in FIG. 3A with the ear buds inserted in the slots and the covering in the open position.

FIG. 6A illustrates an alternative embodiment of a mobile device case with a sliding detachment dock that contains slots for earbuds from a front view.

FIG. 6B illustrates a rear bottom left-angled view of a mobile device case shown in FIG. 6A with the sliding detachment dock partially opened.

FIG. 6C illustrates a front bottom left-angled view of a mobile device case shown in FIG. 6A with the sliding detachment dock partially opened.

FIG. 8A illustrates a rear view of a mobile device case shown in FIG. 7A with a battery pack.

FIG. 8B illustrates a rear bottom right-angled view of a mobile device case shown in FIG. 7A.

FIG. 9A illustrates an embodiment of custom earbuds that attach to a mobile device case.

FIG. 9B illustrates the earbuds shown in FIG. 9A attached together via magnets.

FIG. 14A illustrates a rear top left-angled view of the mobile device case shown in FIG. 13A.

FIG. 14B illustrates a rear top right-angled view of the mobile device case shown in FIG. 13A.

FIG. 15A is an example of the mobile device case shown in FIG. 13A with the mobile device housed inside the case.

FIG. 15B illustrates a front view of the mobile device case shown in FIG. 13A without the mobile device inserted into the cavity.

FIG. 16A illustrates a top view of the mobile device case shown in FIG. 13A.

FIG. 16B illustrates a bottom view of the mobile device case shown in FIG. 13A.

FIG. 17A illustrates a right side view of the mobile device case shown in FIG. 13A.

FIG. 17B illustrates a left side view of the mobile device case shown in FIG. 13A.

FIG. 27A illustrates a back view of the alternative embodiment of the mobile device case shown in FIG. 26A. The illustration shows both enclosures secured shut.

FIG. 27B illustrates a back view of the alternative embodiment of the mobile device case shown in FIG. 26A. The illustration shows both enclosures open.

FIG. 27C illustrates a bottom view of the alternative embodiment of the mobile device case shown in FIG. 26A. The illustration shows both enclosures closed.

DETAILED DESCRIPTION

Throughout this specification, numerous terms and expressions are used in accordance with their ordinary meanings. Provided below are definition of some additional terms and expressions that are used in the description that follows.

As used in the present specification, "mobile device" refers to a portable computing device that includes an operating system. A mobile device includes a smartphone, mobile communication device, mobile phone, personal digital assistant, personal music/video/content player, satellite navigation system, storage devices, and the like. For the purpose of illustration and not limitation, the following detailed description provides examples that illustrate the present invention for a smartphone (e.g., Apple™ iPhone 7™).

As used in the present specification, "earbud" refers to a wireless device designed to fit within, at least partially, a human ear that emits audible sounds in that corresponds to audio signals received from the mobile device. For the purpose of illustration and not limitation, the following detailed description provides examples that illustrate an in-ear headphone (e.g., Apple™ Airpods™).

The description which follows and the embodiments described therein are provided by way of illustration of an example or examples of particular embodiments of the principles of the present invention. In the following description of the invention, numerous examples are provided and specific details are set forth for the purposes of explanation and not limitation in order to provide a thorough understanding of the invention. Those that are skilled in the art will readily appreciate that the well-known methods, procedures and/or components will not be described as to focus on the invention in question. Accordingly, in some instances, certain structures and techniques have not been described or shown in detail in order not to obscure the invention.

The various embodiments described herein provide a mobile device case usable as a place for storage and charging for earbuds, and may provide an additional battery source for a mobile device. The case may allow for one or more of the following: (1) a convenient storing place for earbuds to prevent loss or damage, (2) a convenient storing option and protective casing for a mobile device to prevent damage, (3) a reserve battery pack for a mobile device to lengthen times between charges, (4) a reserve battery pack to charge one or more earbud, eliminating the need to carry an additional charging accessory, (5) a wireless feature integrated in the mobile device case to bridge the wireless (e.g., Bluetooth®) and the like) connection between the mobile device and ear bud, providing enhanced security for earbud users, and (6) an auxiliary cord connection via auxiliary jack to stream audio.

Figure 1:
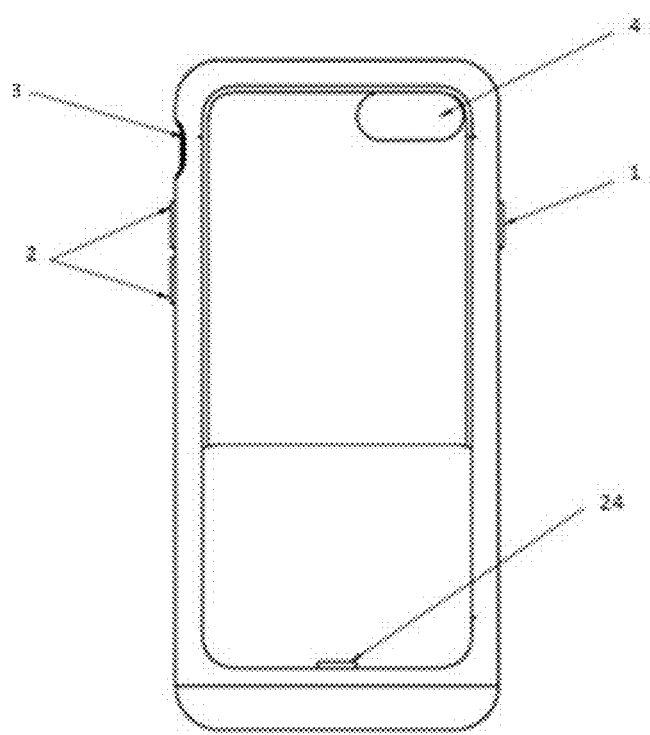
FIG. 1 illustrates a front view of a mobile device case.

FIG. 1 illustrates a front view of a mobile device case according to one embodiment. The case comprises a main body having a back panel, a left panel, a right panel, a top panel, and a base to define a cavity for receiving the mobile device. The right, left, top, and bottom panel, form a bumper around the edge of the mobile device to hold it in place and provide protection against contact with another object including impact with the ground. FIG. 1 illustrates a front view of a case with apertures that allow access to mobile device features such as the volume controls 2, switch 3, camera 4, and power button 1. In the present embodiments, the mobile device case may have a mobile device interface 24 that enables interaction with the mobile device to facilitate the wireless (e.g., Bluetooth®) bridging feature and/or charging of the device. The mobile device case may be fabricated as a single unit made of a flexible material so that the device and one or more earbuds may fit snugly in the case while allowing the user access to phone buttons 1-4 and headphone jack, as needed. In some embodiments, the mobile device cases may be assembled from complimentary components made of various materials including flexible materials. Regardless of the manner of fabrication, the case can be shaped to fit a particular brand of mobile device or any mobile device (i.e., a "universal" case), allowing full range of access to all available mobile device buttons, mobile device interfaces, and other mobile device features. The case may also be made of other suitable materials including, but not limited to, rigid plastics, metals, polyurethane, thermoplastic polyurethane, rubber or other soft plastics, or natural fibers such as wood, leather or cork. The case may comprise many different combinations of materials in any preferred colour. In some embodiments, images, pictures, and other graphics may be printed on the case.

FIGS. 2A-C illustrate another embodiment of a mobile device case with two earbud interfaces (i.e., slots 22) and two coverings 23 that open on a hinge 21 and a battery pack 11. FIG. 2A illustrates a rear top left-angled view of a mobile device case with one earbud 8 partially inserted in the storage slot 22, and the second earbud inserted fully into the slot 22 with the covering 23 closed, securing the earbud in place. FIG. 2B shows a rear bottom right-angled view of the mobile device case with a first earbud 8 partially inserted in the storage slot 22, and the second earbud inserted fully into the slot 22 with the covering 23 closed, securing the earbud in place. In some embodiments, the covering 23 may be maintained in the closed position using magnetic attraction (e.g. using permanent or electromagnets or combinations thereof) between the lid and the main body of the mobile device. In other embodiments, the covering 23 may be secured in the closed position mechanically. The shaft portion of the earbud can slide into the covering 23 through a suitable support element such as a sheath (not shown) that generally conforms to the shape of the earbud shaft. The storage slot 22, or docking area, may conform to the shape of the earbud 8 it is intended to receive. In some embodiments, the storage slot 22 or the docking area may be provided with a suitable flexible material that can deform to fit the earbud 8 so as to accommodate a greater range of earbuds having various shapes and configurations. The hinge 21 allows the opening of the covering 23 to release the earbud 8 or the closing of the covering 23 to secure the earbud 8 in place. For the present embodiment and particular earbud design, the top of the earbud may be left exposed while the shaft is secured within the covering 23. This design feature may be used to indicate that the earbuds 8 are safely stowed in the storage slot 22. In some other embodiments, the earbuds may be completely enclosed.

The case of the present embodiment may further include a battery pack 11 integrated with the main body. Specifically, in the present embodiment, one or more power cells may be enclosed in a protrusion of the back panel of the main body of the mobile device case. The battery pack 11 may alternatively be enclosed within the back panel of the case without the use of a protrusion. The case may also have an opening 9 to receive an interface cable such as a USB-C cable, or other suitable interface cables, to provide charging of the mobile device or mobile device case and to provide data communication between the mobile device and an external device or between the mobile device case and an external device.

FIGS. 3A-B and FIGS. 4A-C illustrate another embodiment of a mobile device case with two slots 18 within a cavity of the mobile device case, a covering 15 movably attached to the main body of the mobile device case via a suitable attachment such as a hinge 17 and a battery pack 11.

FIG. 3A illustrates the mobile device case from a front bottom left-angled view, with one earbud 8 inserted into one slot 18, and the other slot 18 being empty. The covering 15 may be placed in an opened state as shown in FIG. 3A to allow the release of the earbud 8 or the insertion of the earbud 8 into the slot 18 for storage or charging. Charging of the earbud 8 may be performed using an earbud interface within the slot 18 (not shown). The internal charging interface may be connected to the battery pack via internal wiring provided within the main body. Alternatively, a power management system or a controller system may be provided to manage the charging of the earbud 8. FIG. 3B illustrates a rear bottom right-angled view of the mobile device of FIG. 3A with the covering 15 placed in a closed state to secure the earbud(s) 8 in the slot 18. In some embodiments, the covering 15 may be maintained in the closed position using magnetic attraction (e.g. using permanent magnet, electromagnet, and the like, or a combination of any of the foregoing) between the lid and the main body of the mobile device. In other embodiments, the covering 15 may be secured in the closed position mechanically. It may be noted that for the purposes of the present disclosure, "magnet" or "magnets" or "magnetic" may refer to any source of magnetic attraction, including, but not limited to, permanent magnets and electromagnets, whether used alone or in combination to secure one element to another. As seen in FIG. 4A and FIG. 4B, an arm 16 of the covering 15 may be used to link the covering 15 to the hinge 17 so that the covering 15 can be moved to allow removal or insertion of the earbud(s) 8 into the slots 18. FIG. 4A illustrates the position of the arm of the covering 15 when earbuds 8 are inserted and secured in the slots 18 of the mobile device case for storage and/or charging. FIG. 4B illustrates the position of the arm 16 of the covering 15 when earbuds 8 are removed and the slots 18 are empty. FIG. 4C illustrates a side view of the mobile device case of FIG. 3A with the covering 15 in the open position to allow the release of the earbud 8 or the insertion of the earbud 8 into the slot 18.

Figure 5A:
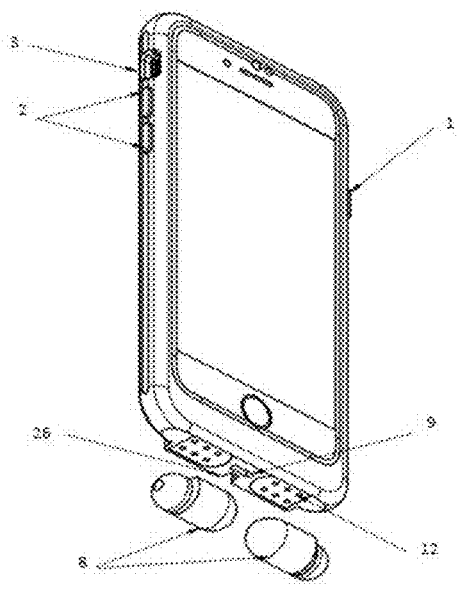
FIG. 5A illustrates an alternative embodiment of a mobile device case with a magnetic dock with the ear buds detached from a front bottom left-angled view.
Figure 5B:
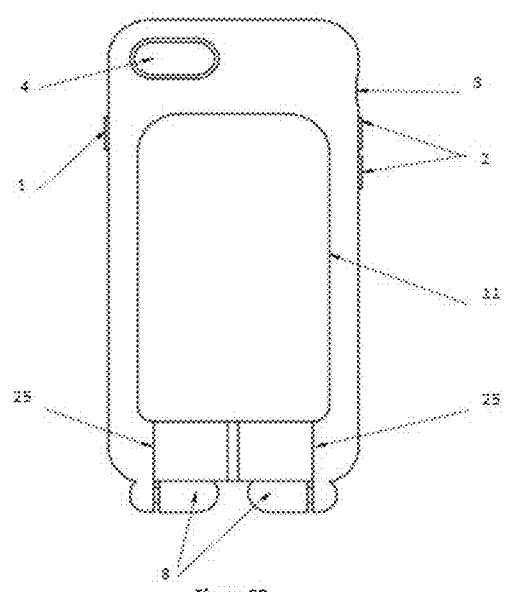
FIG. 5B illustrates a rear view of a mobile device case shown in FIG. 5A with the earbuds attached.
Figure 7A:
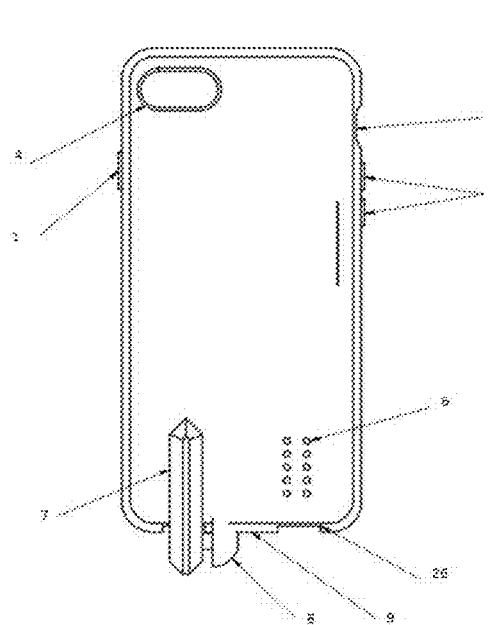
FIG. 7A illustrates an alternative embodiment of a mobile device case with an earbud that attaches to the case from a rear view.
Figure 7B:
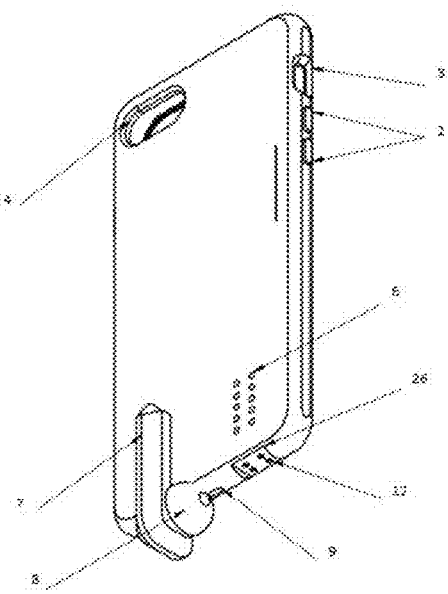
FIG. 7B illustrates a rear bottom right-angled view of a mobile device case shown in FIG. 7A.
Figure 10A:
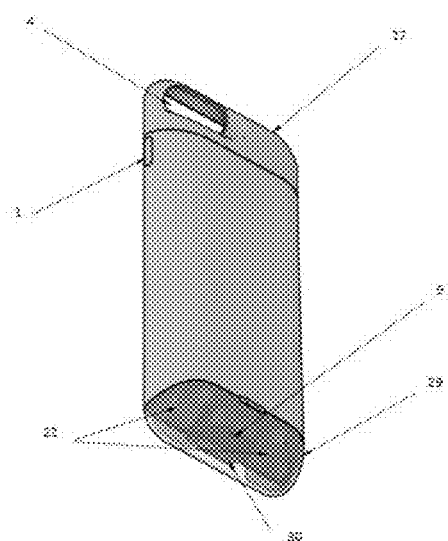
FIG. 10A illustrates an alternative embodiment of a two-piece mobile device case with two slots within the cavity of the mobile device case, a covering attached via a hinge and a battery pack from a rear bottom left-angled view as a 3D drawing.
Figure 10B:
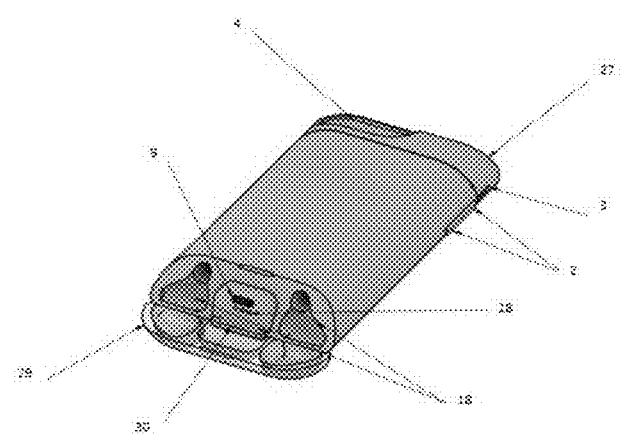
FIG. 10B illustrates a bottom-angled view of the mobile device case shown in FIG. 10A as a 3D drawing with the covering in an open position.

FIGS. 5A-B illustrate another embodiment of a mobile device case with a magnetic dock 26 provided on the mobile device case. The magnetic dock in the present embodiment is located on the bottom portion of the mobile device case with magnetically attachable earbuds 8 removably detached from the magnetic dock 26. In some other embodiments, the magnetic dock may be disposed at another location of the mobile device case. For example, magnetic dock 26 may be positioned on the side of mobile device case or at the top of the mobile device case. The earbuds 8 may secure to the magnetic dock 26 through magnets 12 that interact with the earbuds and additionally provide the earbuds with an electrical charge. In some embodiments where the magnets 12 are be electromagnets, a user may engage or disengage the electromagnetic to hold or release the earbuds 8, respectively. In other embodiments, the magnets 12 are permanent magnets. It may be understood that to make use of the magnetic dock 26, the earbuds 8 may similarly be magnetized to engage with the magnetic dock 26. The magnetic dock 26 may include an aperture 9 with a cable interface to receive cables such as a USB-C cable, or other appropriately similar cables, to provide a mobile device enclosed by the case or the mobile device case itself with a charge. In some embodiments, the mobile device and/or the mobile device case may receive charge wirelessly, for example, using inductive charging techniques and the like. In such embodiments, the aperture 9 may not be needed for delivering a charge. In such cases, the mobile device case may not be required to provide the aperture 9 to receive the cable. Where an aperture 9 is provided, the placement of the earbuds 8 may be positioned on the magnetic dock 26 so that it does not obstruct a cable such as the USB-C cable from reaching its reciprocal opening 9. FIG. 5B illustrates a rear view of a mobile device case shown in FIG. 5A with the earbuds 8 secured to the magnetic dock 26. The earbuds 8 may be charged by a battery pack 11 housed in the back panel or in a protrusion 25 in the back panel of the mobile device case.

FIGS. 6A-C illustrate another embodiment of a mobile device case. The mobile device case of the present embodiment comprises a sliding dock 20 that contains slots for earbuds 8. FIG. 6A illustrates a front view of the mobile device case of the present embodiment with earbuds 8 inserted in the sliding dock 20 that is partially open to allow the removal or insertion of the earbuds 8. In the present embodiment, the earbuds 8 may have magnets 13 on the external surface that interact with the magnets built on the inside top portion of the sliding dock 12 to facilitate storage and the charging of the earbuds, as seen in FIG. 6C. FIG. 6B illustrates a rear view of the mobile device case that houses a battery pack 11 of one or more power cells in a protrusion in the back panel. As noted previously, the battery pack may also be housed within the back panel without a protrusion in other embodiments. In the present embodiment, there is an aperture 9 on the side panel of the protrusion configured to with a cable interface to receive cables such as a USB-C cable, or other appropriately similar cables, to charge a mobile device enclosed by the case and/or the mobile device case itself. In some embodiments, the mobile device and/or the mobile device case may receive charge wirelessly, for example, using inductive charging techniques. In such embodiments, the aperture 9 may not be needed for delivering a charge. In such cases, the mobile device case may not be required to provide the aperture 9 to receive the identified cables.

FIGS. 7A-B and FIGS. 8A-B illustrate an alternative embodiment of a mobile device case with two magnetic docks, the back panel magnetic dock 6, and bottom panel magnetic dock 12 for securing the earbud shaft 7 and earbud 8, respectively, to the mobile device case and receive charge. More specifically, the shaft of the earbud 7 may be secured to the back panel magnetic dock 6 and the inner ear portion of the earbud 8 may be secured to the bottom panel magnetic dock 12. The bottom panel may contain a magnetic dock notch 26 to receive the inner ear portion of the inner ear portion of the earbud 8. Further, in the present embodiment, the magnetic dock notch may be shaped to conform to the shape of the inner ear portion of the earbud 8 when attached to the case. In other embodiments, a dock notch 26 may be absent. The bottom panel magnetic dock 12, or if a dock notch 26 is present, it may not conform to the shape of the inner ear portion of the earbud 8. The placement of the earbuds 8 in the present embodiment may be positioned on the dock so that it does not obstruct the USB-C cord reaching its reciprocal opening 9 in a manner similar to the embodiment of FIG. 5. The case may have a battery pack 11 housed in a protrusion in the back panel of the case as seen in FIGS. 8A-B. In some embodiments, however, the battery pack may be integrated into the back panel so that a protrusion may not be needed.

FIGS. 9A-B illustrate an embodiment of a pair of custom earbuds that may be attached to one or more embodiments the mobile device case described herein. The earbud may include one or more docking pins 13 and charging pins 14 that allow the earbud to secure to a mobile device case and receive electrical charge. The earbud of FIG. 9 comprises a shaft 7 and an inner ear portion 8 operable to emit audible sound. Each earbud in the pair of earbuds can also attach to each other via the magnetized docking pins 13 to stay together and decrease likelihood of misplacing them. Alternatively, each of the earbuds may magnetically attach with a docking position located in the mobile device case described herein.

Figures 11A, 11B:
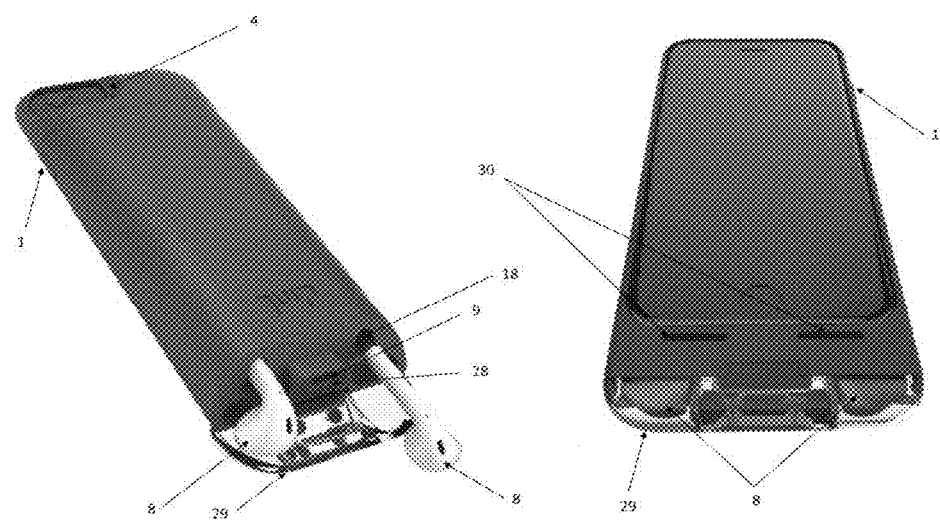
FIG. 11A illustrates a rear bottom left-angled view of the mobile device case shown in FIG. 10A as a 3D drawing.
FIG. 11B illustrates a front bottom angled view of the mobile device case shown in FIG. 10A as a 3D drawing.

FIGS. 10A-B, 11A-B, and 12 illustrate an embodiment of a multi-piece mobile device case. Specifically, the mobile device case of the present embodiment is a two-piece mobile device case comprising two slots 18 within a cavity of the mobile device case for receiving earbuds 8, a covering 29 attached via hinge 30 and a battery pack from (not shown) located in the back portion. The 3D drawings of FIGS. 10A-B, 11A-B, and 12 show that in the present embodiment, a transparent covering 29 can be used to enclose the earbuds 8 when they are placed in the charging slots 18 with sufficient enclosed space provided to cover the inner ear portion of the earbud 22. While the present embodiment makes use of a transparent covering 29 other types of covering such as an opaque covering may similarly be used. The material of the covering may be any suitable material to provide protection to the earbuds 8 and may include, but not limited to, rigid plastics, metals, rubber, thermoplastic urethane, polyurethane, or other soft plastics, or natural fibers such as wood, leather or cork. The covering may also be tinted with various desired colours. During use, the covering may open to allow the earbuds to slide in the earbud interface (e.g., slot 18) to charge, as seen in FIG. 11A. A cable interface, such as a USB-C port 9 is also be positioned within the covered portion of the case, as seen in both FIGS. 10A and 10B. Other types of cables interfaces may be used depending on the design, including, but not limited to micro USB and Apple™ lightning Port™. In some embodiments, the covering 29 may include an opening or aperture (not shown in FIGS. 10-12), to enable access to the cable interface 9. Such an aperture may be used to enable access to the cable interface 9, even when the covering 29 is in the closed position. For example, the cable interface 9 may be used to connect an external power supply to the mobile device case to charge the mobile device, the mobile device case, earbuds 8 or combinations thereof, even while the earbuds 8 are stored within the mobile device case and protected by the covering 29 in the closed position. As with previously described examples, in some embodiments, the covering 29 may be maintained in the closed position using a magnetic attraction (e.g. using permanent magnets, electromagnets, and the like, or a combination of any of the foregoing) between the lid and the main body of the mobile device. In other embodiments, the covering 29 may be secured in the closed position mechanically.

In the illustrated embodiment, next to the USB-C port 9 is a battery indicator 28 operable to indicate what device is being charged (e.g., earbuds only, or mobile device only or both) and/or remaining battery level. In other embodiments the battery indicator 28 may be located at a more visible location such as the back panel of the mobile device case or the top panel of the mobile device case. The battery indicator 28 may comprise a series of lights such miniature light emitting diodes (LEDs). The number of LED lights that are active (i.e., lit up) can be used to reflect the level of charge available in the battery pack. For example, in the illustrated embodiment, there are three light indicators, so that when all three lights are on, it represents a full battery. In other embodiments, the battery indicator may be a single light source operable to emit different colours to reflect the level of charge available in the battery pack. For example, a green light may indicate a full charge, a yellow or amber light may indicate a partial charge and a red light may indicate low charge (i.e., recharging is needed). In some embodiments, the battery indicator may be a miniaturized LED, OLED, or other types of display configured to indicate a numerical value reflective of the level of charge available in the battery pack. For example a value of 100 may indicate a 100% charged battery pack, a 50 may indicate charge level at 50% of the full capacity and 0 may indicate a fully depleted power battery pack.

Figure 12:
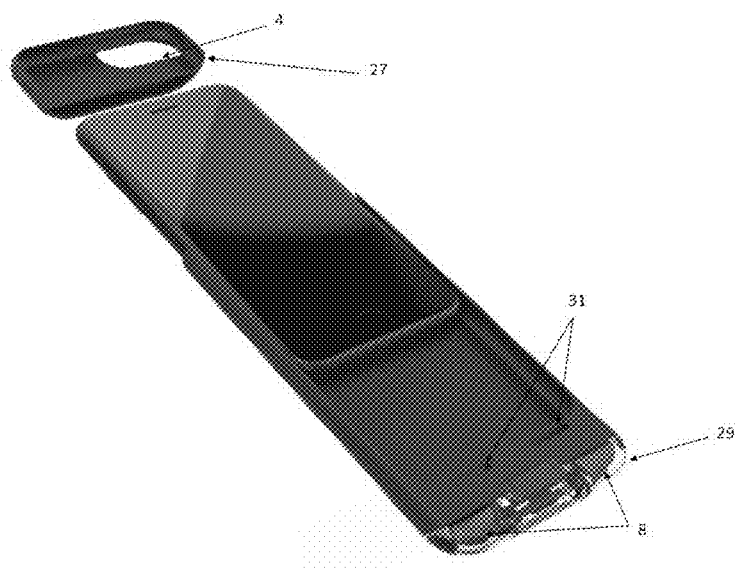
FIG. 12 illustrates a front bottom left-angled view of the mobile device case shown in FIG. 10A as a 3D drawing with the detachable top piece removed from the case.

Referring back to the illustrated embodiment, this embodiment of the mobile device case may be configured with two detachable pieces, a top piece and a bottom piece, that enclose around the mobile device. The detachable top piece 27 may be removed from the bottom piece to allow for the mobile device to slide in or out of the bottom piece, as seen in FIG. 12. The each of the top and bottom pieces of the mobile device case may also include apertures to allow access to mobile device functions 1-4. In other embodiments, the case may be configured with more than two detachable pieces. For example, in some embodiments, the mobile device case may be configured with three detachable pieces, a top piece, middle piece and a bottom piece (not shown). The mobile device may be slidable at either end of the middle piece. A multi-piece mobile device case may allow broken or damaged portions to be replaced, without requiring a user of the mobile device case to purchase a new complete case. Furthermore, use of multiple pieces may facilitate customization of the mobile device case by enabling the user to mix and match pieces of different colours and/or materials.

FIGS. 13-18 illustrate another embodiment of a mobile device case with two earbud interfaces (e.g., slots 33) positioned at the base of the case. Each slot 33 may include an aperture 18 enabling insertion of earbud therethrough and into the slot 18. One or more power cells 11 may be enclosed in a back panel of the case. Specifically, in the present embodiment, the power cells 11 are enclosed in a back panel protrusion 32 of the case. In other embodiments, the power cells 11 may be enclosed within the back panel so that the protrusion 32 is absent.

Figures 13A, 13B:
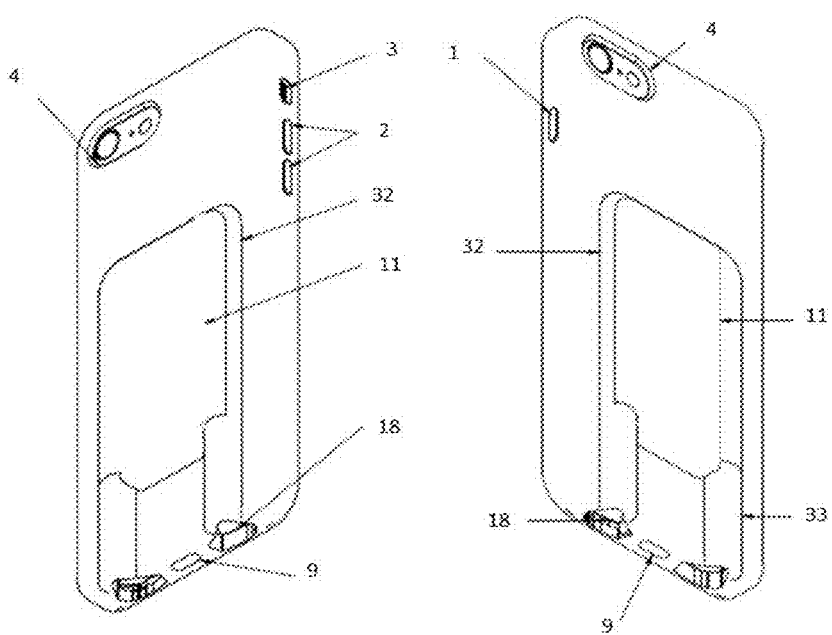
FIG. 13A illustrates a rear bottom left-angled view of a mobile device case with a battery pack and two earbud sheaths.
FIG. 13B illustrates a rear bottom right-angled view of a mobile device case shown in FIG. 13A.

FIGS. 13A-B show a rear bottom left and right-angled views, respectively, of an embodiment of the mobile device case with a battery pack and earbud sheath. As seen in FIG. 15B, the mobile device case may generally comprise a back panel, a left panel, a right panel, a top panel, and a base. The right, left, top, and bottom panels may be configured to form a bumper to hold a mobile device such as a smartphone in place by surround the edge of the mobile device and provide protection against contact with another object such as impacts with the ground. The mobile device case may further allow for access to controls and features of the mobile device. For example, if the mobile device is a smartphone, then the mobile device case may provide access to buttons 1 and 2, the phone's imaging system including external lights and camera lenses 4, interfaces for power supply connection 9, and other phone features, such as the silent switch 3. Other embodiments may provide additional access structures depending on the design of the associated mobile device. In the illustrated embodiment, the mobile device case houses one or more power cells contained in a battery pack 11 in a protrusion 32 in the back panel of the case, as well as two earbud interfaces (e.g., slots 33), each having an aperture 18 at the base. As noted previously, alternative embodiments of the mobile device case may provide a battery pack within the back panel so that a protrusion 32 is absent. In some embodiments, the battery pack is removably swappable from the case.

In the illustrated embodiment, each earbud aperture 18 is sized and shaped to complement the size and shape of a compatible earbud. As such, not only can the earbud be acceptably inserted into the slot through the aperture, but the shape of the aperture guides the earbud to be inserted at a specific position within the slot. For example, if a user attempts to force the earbud through the aperture 18 without proper alignment, the earbud either will be prevented from full insertion into the slot 33 or will be urged, via contact with edges of the aperture 18 into proper alignment so that the earbud can be fully inserted into the slot.

FIGS. 14A-B illustrate a perspective rear top left and right-angled view of the embodiment of the mobile device case of FIG. 13A. These figures show the mobile device case providing access to the various controls that may be available on the mobile device enclosed by the case.

FIG. 15A illustrates a front view of the mobile device case of FIG. 13A with the mobile device and earbuds housed within the mobile device case.

FIG. 15B illustrates a front view of the mobile device case of FIG. 15A with the mobile device removed. In the present embodiment, the mobile device case may be a single unit made of a flexible material so that the device and one or more earbud may fit snugly within the case while allowing the user access to phone buttons 1 and 2, headphone jack, and other device interfaces as needed and as available on the associated device. The mobile device case can be shaped to fit any mobile device, allowing full range of access to all buttons, interfaces, and device features. The case may also be made of rigid plastics, metals, rubber, thermoplastic urethane, polyurethane, or other soft plastics, or natural fibers such as wood, leather or cork. The case may comprise many different combinations of materials in many different colours.

Continuing with reference to FIG. 15B, a mobile device interface 24 on the mobile device case may be configured to align with, and to connect to, an internal interface of the mobile device when the mobile device is inserted into the case. As such, the mobile device case may be is electronically connected to the mobile device. The mobile device interface 24 may be used, for example, to provide power to the mobile device or be used as a data interface to send and/or receive data between the mobile device enclosed within the mobile device case and an external device such as a computer. The mobile device interface may be any suitable interface including, but not limited to, USB type c (USB-C) port, micro USB, or Apple™ Lightning™ port.

FIG. 16A illustrates a top view of the mobile device case of FIG. 13A.

FIG. 16B illustrates a bottom view of the mobile device case of FIG. 13A including earbud interfaces 33 for receiving earbuds. The earbud interfaces 33 may be generally cylindrical in shape and are accessed via apertures 18 which, as discussed above, may be are shaped to fit the earbuds. In the illustrated embodiment, the precise shape of the cylindrical slots 33 may be customized to fit various styles of earbuds. In other embodiments, the earbud interfaces 33 may have other non-circular (i.e., non-cylindrical) cross-sectional profiles to fit the shape of the earbuds. For example, it may be triangular, square or hexagonal. The enclosed one or more power cells 11 may protrude from the back of the case, and the protrusion 32 may have sloping sides. As also discussed previously, alternative embodiments of the mobile device case may provide a battery pack within the back panel so that the protrusion 32 is absent.

With continued reference to 16B, in some embodiments, a portion of the earbud 8 may be visible and protrude slightly from the apertures 18 at the base of the slot when the earbuds are fully inserted into the slot. In other embodiments, the earbuds 8 may be fully enclosed within the slot so that no portion of the earbud protrudes from the associated aperture 18. The earbud 8 may be held in place in the slot by friction, a spring release mechanism, an electromagnet, a sliding mechanism, or other suitable mechanisms and structures. With reference also to FIGS. 21-23, in some embodiments the mechanism used to hold the earbud 8 in place may be accompanied by an external component 39, 40, or 21, such as one or more of a button 39 that pushes the earbud 8 out, a sliding release 40 or 41 which may function by switching the polarity of the electromagnet to repel the earbud 8 out of the slot (see FIGS. 21-23). Other suitable mechanical and electromechanical structures and methods for selectively retaining the earbuds 8 in place within the slot can also be employed.

FIG. 17A illustrates a right side view of the mobile device case of FIG. 13A.

FIG. 17B illustrates a left side view of the mobile device case of FIG. 13A.

Figure 18A:
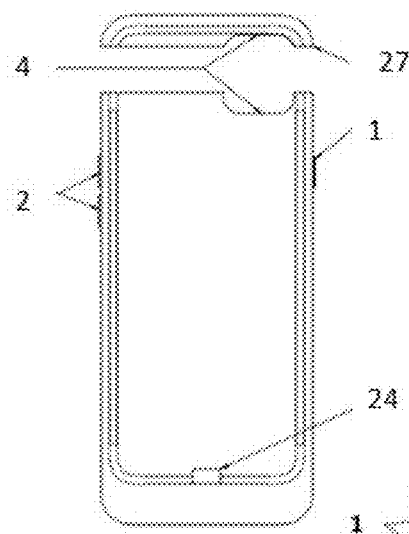
FIG. 18A is an example of an alternative embodiment of the mobile device case with a detachable top portion of the mobile device case presented from a front view.

FIG. 18A illustrates another embodiment of the mobile device case shown from a front view. The case may be comprised of multiple pieces, where the top panel of the case 27 can be removed to allow the phone to be clicked into place in the base of the case and enclosed in place by replacing the top panel 27.

Figure 18B:
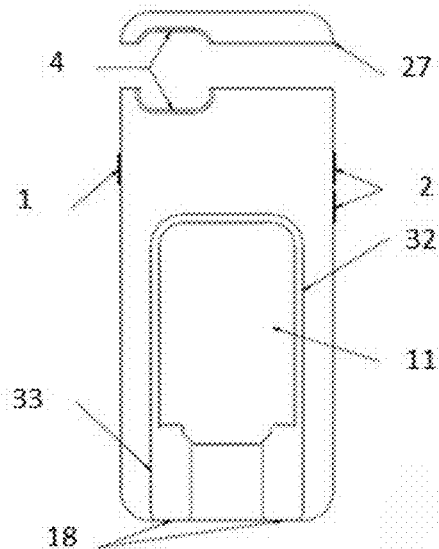
FIG. 18B illustrates a rear view of the alternative embodiment of the mobile device case shown in FIG. 18A.

FIG. 18B illustrates a rear view of the embodiment of the mobile device case of FIG. 18A.

Figure 18C:
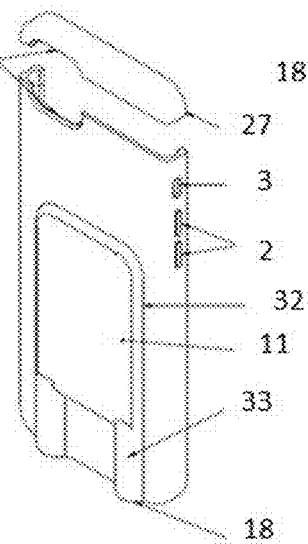
FIG. 18C illustrates a rear top left-angled view of the alternative embodiment of the mobile device case shown in FIG. 18A.

FIG. 18C illustrates a rear top left-angled view of the alternative embodiment of the mobile device case of FIG. 18A.

Figures 19A, 19B:
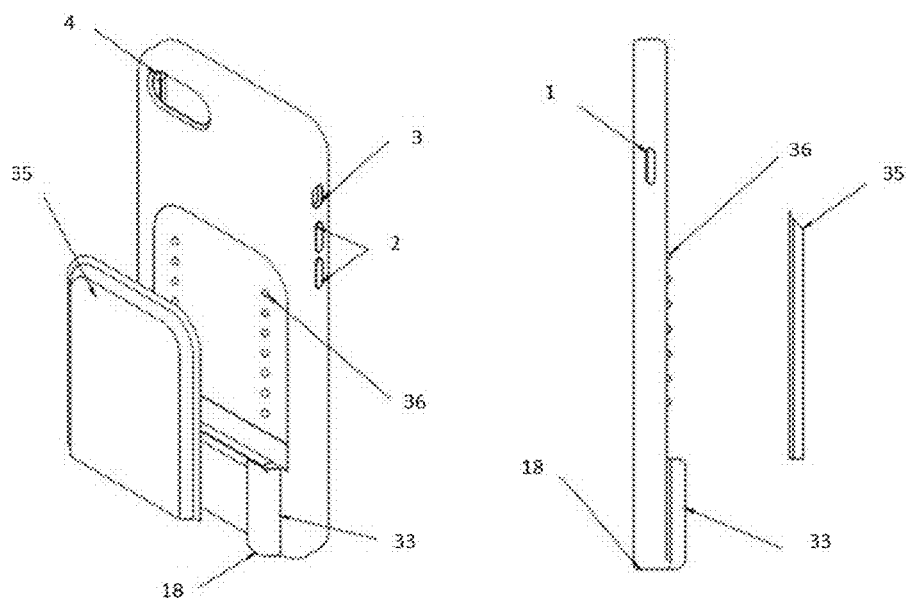
FIG. 19A is an example of an alternative embodiment of the mobile device case from a rear top left-angled, presented with two earbud sheaths and a detachable battery pack.
FIG. 19B illustrates a left side view of the alternative embodiment of the mobile device case shown in FIG. 19A.

FIG. 19A is an example of an alternative embodiment of the mobile device case with two earbud interfaces 33 and a detachable battery pack 35. The detachable battery pack 35 can be reconnected to the mobile device case using pin connectors and/or rails 36 to secure the battery pack in place. When the battery pack is secured to the case, the configuration may appear similar to the mobile device case of FIG. 13A as a protrusion 32 in the back panel of the case.

FIG. 19B illustrates the left side view of the mobile device case of FIG. 19A.

Figures 20A, 20B:
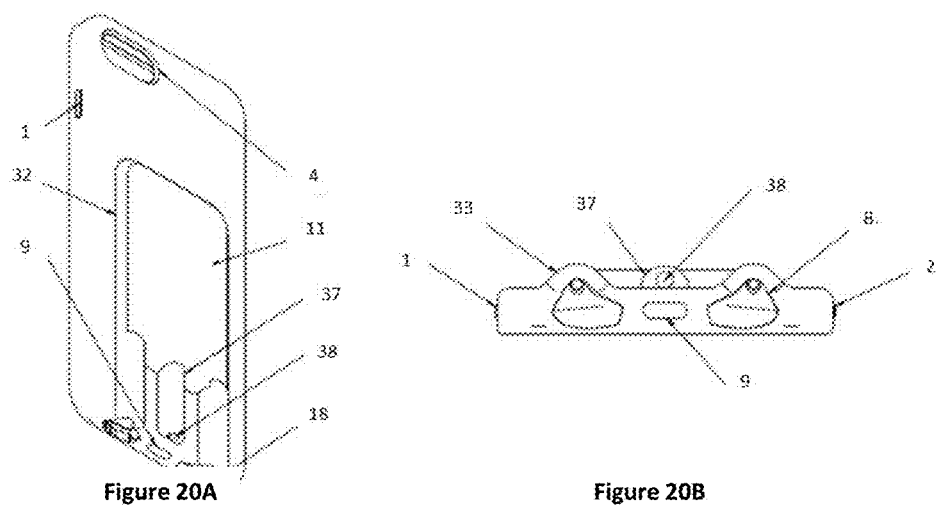
FIG. 20A is an example of an alternative embodiment of the mobile device case with a battery pack, two earbud sheaths and an auxiliary jack, presented from a rear bottom left-angled view.
FIG. 20B illustrates a bottom view of the alternative embodiment of the mobile device case shown in FIG. 20A.

FIG. 20A is an example of another embodiment of a mobile device case viewed from a rear bottom right-angle with a battery pack 11, two earbud interfaces 33 and auxiliary jack 37. The auxiliary jack 37 of the present embodiment is provided as a protrusion in the back panel of the case. The auxiliary jack 37 may be used as an external interface operable to receive an auxiliary cord at the entrance 38 of the auxiliary jack 37 and/or a similar technology to transmit audio generated by a mobile device housed within the case along the auxiliary cord. For example the auxiliary jack may be a 2.5 mm audio jack and the auxiliary cord may be the cord of a pair of wired headphones. An internal interface of the auxiliary jack 37 may be provided to facilitate connection of the auxiliary jack to a corresponding interface of the mobile device when the mobile device is housed in the case to transmit audio signals. This configuration may allow the option of using wired earphones or wireless earbuds with the mobile device case. This configuration may be available in mobile devices case for use with mobile devices that do not feature an auxiliary jack (e.g., iPhone™ 7), otherwise, the mobile device case may simply feature an aperture to provide access the mobile device's auxiliary jack.

FIG. 20B illustrates a bottom view of the mobile device case of FIG. 20A.

Figure 21A:
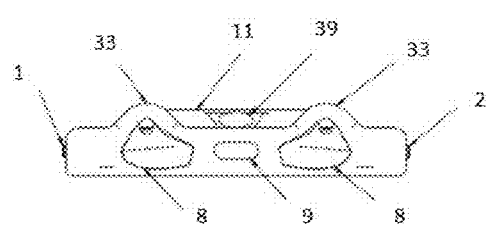
FIG. 21A illustrates a bottom view of an example of one potential functionality to release the earbuds from the earbud sheaths. In this figure, the release trigger is a button.
Figure 21B:
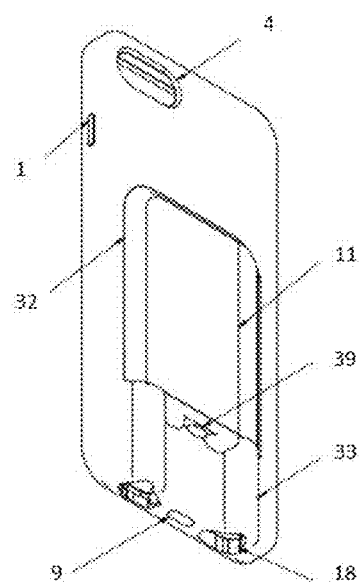
FIG. 21B illustrates a back view of the alternative embodiment of the mobile device case shown in FIG. 21A.

In some embodiments, as shown in FIGS. 21-23, an earbud release button 39 of FIGS. 21A and 21B can be configured to interact with a spring mechanism as discussed above. In another embodiment, the earbud release button 39 may directly impinge upon a mechanical device that extends into each of the earbud interfaces 33. The structure can take multiple forms, and any suitable form known to those skilled in the art may be deployed and used in conjunction with the earbud release button 39. In one embodiment, the mechanical device may be hinged so that pressing the earbud release button 39 in an upward direction urges portions of the mechanical device in each of the slots in a downward direction. In such, if an earbud is within the associated slot, the mechanical device will push the earbud at least partially out of the slot aperture. The user can then manually remove the earbud completely from the mobile device case.

Figure 22A:
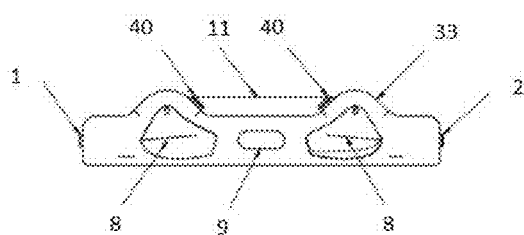
FIG. 22A illustrates an alternative embodiment of the mobile device case from a bottom angle. This embodiment includes a slider for each earbud sheath to eject each earbud individually.

FIG. 22A is an example of another embodiment of the mobile device case viewed from a bottom-up angle with an earbud release slider 40 for each individual earbud. The embodiment of FIG. 22A includes the rear protrusion 32 for the battery 11, two earbud interfaces 33 and apertures for the charging cable 9, earbuds 8, and buttons 1 and 2. The earbud release sliders 40 may function mechanically or electromagnetically to secure and release the earbuds. For example, in one embodiment, a projection (not shown) may extend from the slider 40 through the slot (not shown). When the projection is in the position shown in FIG. 22B, the projection will not interfere with an earbud that may be received in the slot. However, when the slider 40 is moved downwardly, the projection will engage any earbud within the slot, urging the earbud at least partially out of the slot so as to be accessible and removable by a user. In some embodiments, the slots may make use of magnets to hold the magnetized earbuds in place. In such an embodiment, the slider 40 can be configured so that downward movement may cause similarly polarized magnets in the earbud and slot to repel one another so as to cause the earbud be urged out of the aperture. Notably, in the illustrated embodiment, a slider 40 is provided for each earbud interface to permit removal of earbuds one at a time. In other embodiments, a single slider 40 may be used to urge both earbuds out of their respective slots 18 as described in more detail below.

Figure 22B:
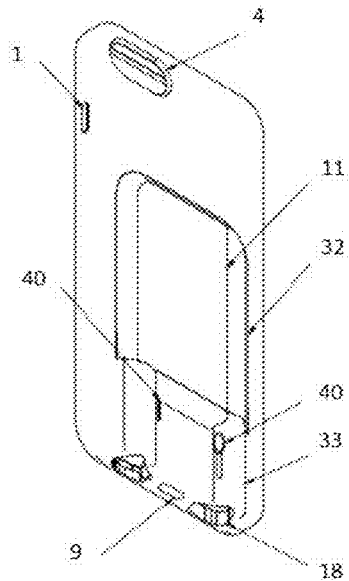
FIG. 22B illustrates a back view of the alternative embodiment of the mobile device case shown in FIG. 22A.

FIG. 22B illustrates a back view of the mobile device case shown in FIG. 22A.

Figure 23A:
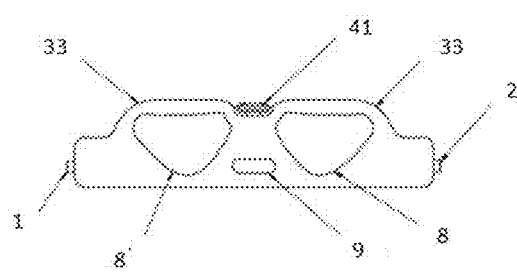
FIG. 23A illustrates and alternative embodiment of the mobile device case from a bottom angle. This embodiment includes a single slider to eject both earbuds from their sheaths simultaneously.
Figure 23B:
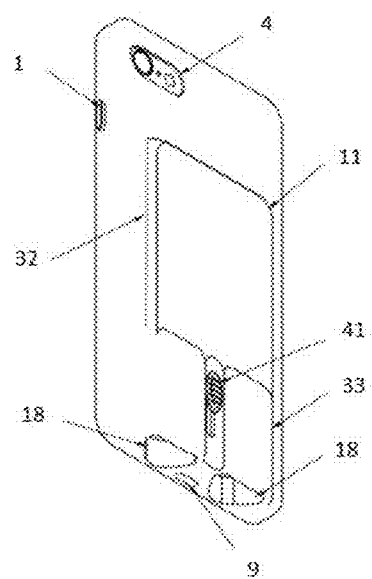
FIG. 23B illustrates a back view of the alternative embodiment of the mobile device case shown in FIG. 23A.

FIG. 23A-B illustrates another embodiment of the mobile device case. FIG. 23A viewed from a bottom-up angle with a single earbud release slider 41 which releases both earbuds simultaneously. The slider 41 may release the earbuds from their sheaths 33 via the earbud apertures 18.

Figure 24A:
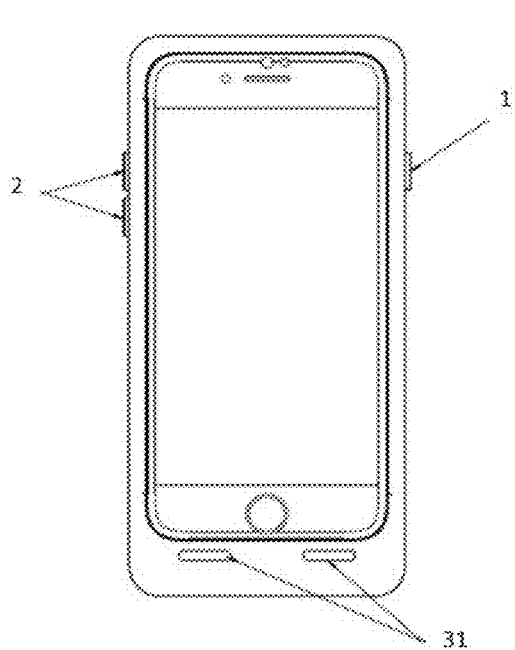
FIG. 24A illustrates an alternative embodiment of the mobile device case from the front. This embodiment includes two speaker grills.

FIG. 24A illustrates another embodiment of the mobile device case, shown from the front. This embodiment includes two speaker grills 31. The two speaker grills 31 may be integrated into the base portion of the mobile device case, and interact with the mobile device such as a smartphone when inserted into the case to emit sound.

Figure 24B:
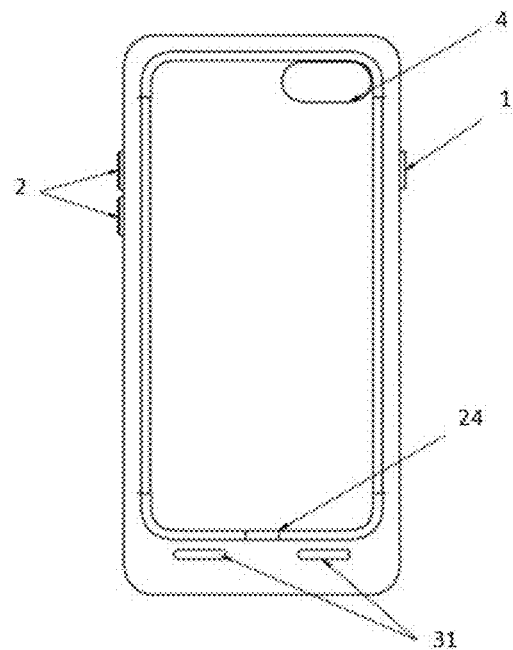
FIG. 24B illustrates a front view of the alternative embodiment of the mobile device case shown in FIG. 24A with the phone removed from the case.

FIG. 24B illustrates a front view of the embodiment of the mobile device case of FIG. 24A with two speaker grills 31 and the smartphone removed from the case.

Figure 25A:
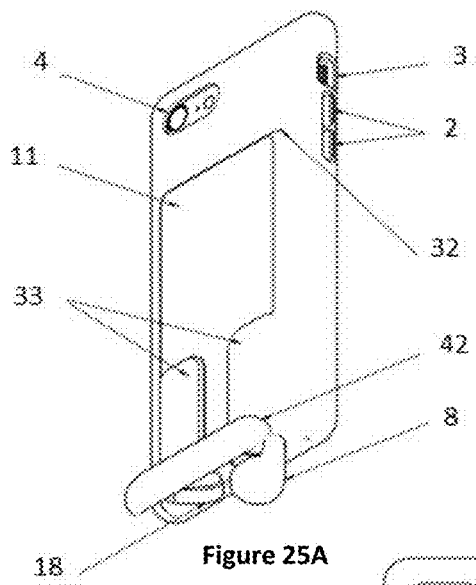
FIG. 25A illustrates a rear bottom left-angled view of an alternative embodiment of the mobile device case. This embodiment includes a single magnetic enclosure to secure the ear buds in the sheaths. The illustration shows the enclosure open with an earbud inserted in one of the sheaths.

FIG. 25A illustrates a rear bottom left-angled view of another embodiment of the mobile device case. This embodiment includes a single magnetic enclosure 42 to secure the earbuds in the slots 18. The illustration of FIG. 25A shows the enclosure 42 open with an earbud 8 inserted in one of the slots.

Figure 25B:
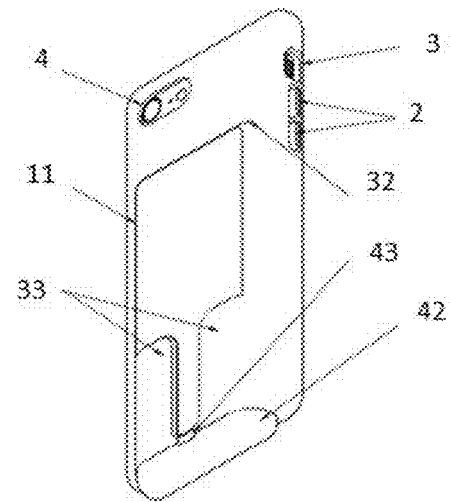
FIG. 25B illustrates a rear bottom left-angled view of the alternative embodiment of the mobile device case shown in FIG. 25A with the enclosure secured shut.

FIG. 25B illustrates a rear bottom left-angled view of the mobile device case of FIG. 25A with the enclosure 42 secured shut. The enclosure may open and close via a hinge mechanism 43 and may be held shut by magnets. It is to be understood that, in additional embodiments, other methods for closure, such as mechanical closure devices, can be employed to securely shut the enclosure 42 in the closed position.

Figure 25C:
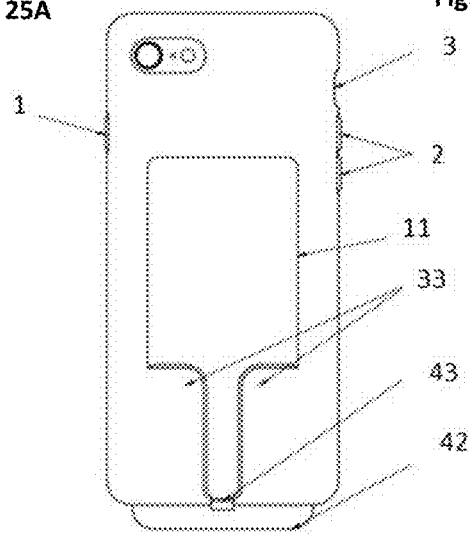
FIG. 25C illustrates a back view of the alternative embodiment of the mobile device case shown in FIG. 25A with the enclosure secured shut.

FIG. 25C illustrates a back view of the mobile device case of FIG. 25A with the enclosure 42 secured shut in the closed position.

Figure 26A:
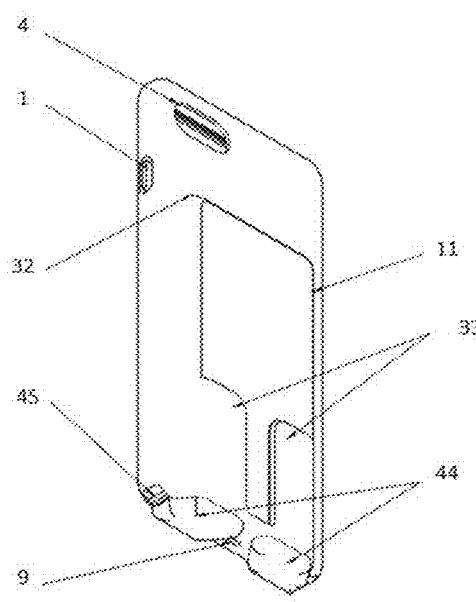
FIG. 26A illustrates a rear bottom right-angled view an alternative embodiment of the mobile device case. This embodiment includes two magnetic enclosures that secure each ear bud in their respective sheath. The illustration shows both enclosures secured shut.

FIG. 26A illustrates a rear bottom right-angled view of yet another embodiment of the mobile device case. In this embodiment, the mobile device case may be configured to include two enclosures 44 that that may be used to secure each earbud of a pair of earbuds in their respective slot 33. The illustration of FIG. 26A shows both enclosures 44 secured shut in a closed position. Each of the enclosures 44 may be placed in an open or closed position using a corresponding hinge mechanism 45 and may be held shut using one or more magnets or another closure mechanism know to those skilled in the art, as desired. The hinge mechanism 45 may be place at the front, back, or sides or at any other suitable location of the enclosures 44. In some embodiments, a control button (not shown) may be provided to control the open and closing of the enclosures 44. For example, the control button may control the opening of both enclosures 44 enabling a user to "toggle" the enclosures 44 between an open and closed position. In other embodiments, each enclosure 44 may be provided with its own control button to "toggle" between an open and a closed position so that each enclosure 44 may be opened or closed independently of the other enclosure 44.

Figure 26B:
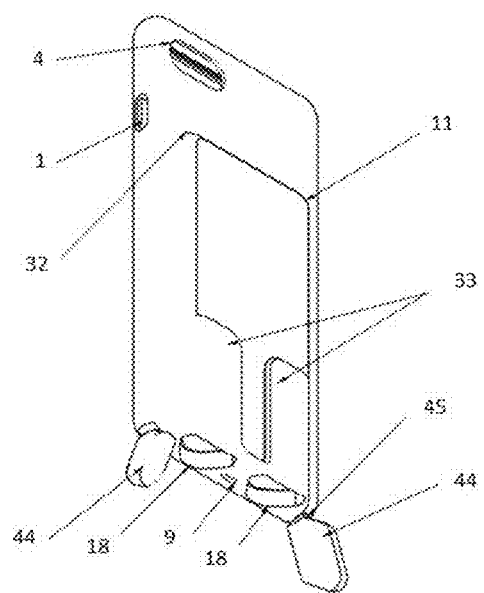
FIG. 26B illustrates a rear bottom right-angled view of the alternative embodiment of the mobile device case shown in FIG. 26A. The illustration shows both enclosures open.

FIG. 26B illustrates a rear bottom right-angled view of the mobile device case of FIG. 26A. The illustration shows both enclosures 44 in the open position for receiving earbuds into the slots 33 or for a user to remove earbuds placed in the slots 33.

FIG. 27A illustrates a back view of the mobile device case of FIG. 26A. The illustration shows both enclosures 44 secured shut in the closed position with the earbuds in the slots 33.

FIG. 27B illustrates a back view of the mobile device case of FIG. 26A. The illustration shows both enclosures 44 in the open position by way of the hinge mechanism 45 and one or more magnets or other suitable closure mechanism.

FIG. 27C illustrates a bottom view of the mobile device case of FIG. 26A. The illustration shows both enclosures 44 in the closed position. In the present embodiment, the hinge mechanism 45 used opening and closing the enclosures 44 may be placed on the outer side of the enclosure 44. However, as noted previously, the hinge may be placed at other suitable locations such as at the front, back or side to accommodate the opening of the enclosure 44. The present embodiment further includes an aperture 9 for receiving a charging cable or data cable. The aperture may be used to provide charge to the mobile device case, to the mobile device enclosed by the case or to both. The aperture may also provide a data cable interface for connecting a data connection to the mobile device enclosed by the case. For example, electrical connections for data transfer may be facilitated via internal electrical wiring used to link the data cable interface of the aperture with the data cable interface of the mobile device. These data cable interface may include but not limited to USB type c (USB-C) port, micro USB, or Apple™ Lightning™ port. The interface used may be configurable to carry both charge and data over the same physical cable. An external data cable can then be connected to the aperture 9 to enable data communication between the mobile device and an external device. The aperture 9 may be positioned so that it is in an unobstructed location, in between the two enclosures 44 in the present embodiment, to receive the charging cable or data cable. However, in other embodiments, the aperture may be positioned at other suitable locations of the mobile device case that may be convenient for user access.

Figure 28:
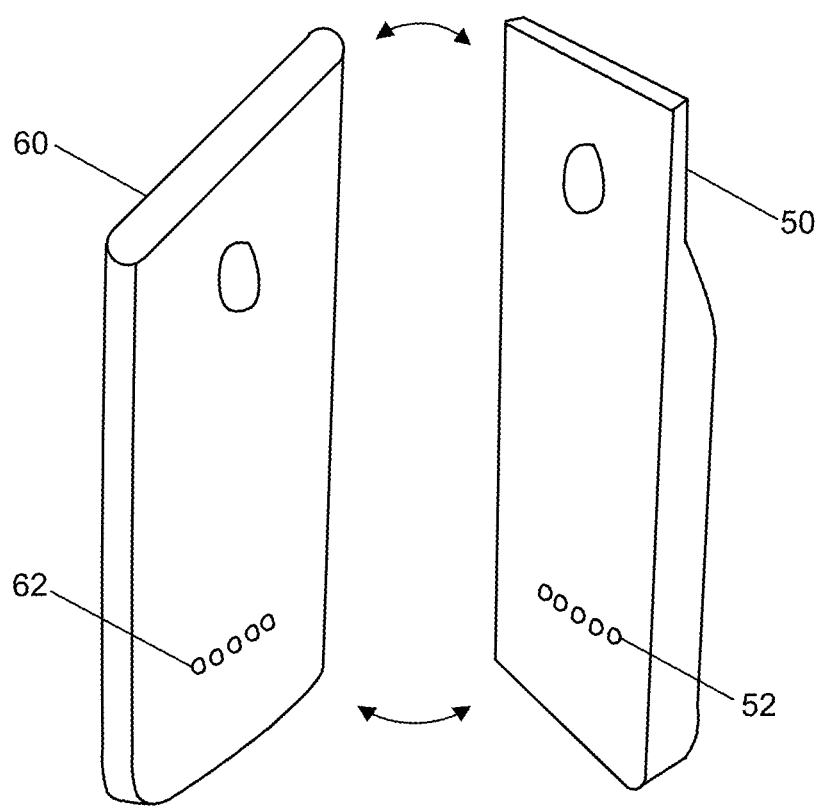
FIG. 28 illustrates an embodiment of the mobile device case attachable to a rear position of a mobile device.

FIG. 28 illustrates another embodiment. In this embodiment, rather than having a more traditional mobile device case structure, equipped with panels positioned adjacent to the mobile device to protect the top, bottom and side walls of the mobile device, the mobile device case 50 may be configured to fit or attach upon the back side of the mobile device 60 such as a mobile phone. The mobile device case 50 may, in some embodiments, be configured to be held onto the back of the device by magnets or by other suitable mechanisms such as, but not limited to, mechanical latches or snap-fitting mechanisms.

The mobile device case 50 may include interfaces 52 by which the mobile device case 50 can interact electronically with the mold of a mobile device 60 via corresponding interfaces 62 on the mobile device. Such electronic interaction can include delivery of electrical power back and forth between the mobile device 60 and the mobile device case 50 and, in some embodiments, can include data signal delivery for exchanging data between the mobile device case 50 and the mobile device 60. The mobile device case 50 may further include slots, apertures, and power structures such as those described in any of the above-discussed embodiments.

The mobile device case can be equipped with power cells and various electrical components (not shown) which may include a controller unit for controlling the operation of the mobile device case and its interaction with the mobile device via interfaces 52, corresponding system firmware, printed circuit boards, an authentication chip (e.g., to enable pairing of one or more mobile devices to a given mobile device case for usage of the mobile device case as a bridging device as described in more detail subsequently), a battery charging unit (e.g., power controller unit for regulating power distribution to the mobile device case, the mobile device, earbuds secured to the mobile device case or combinations thereof), wires, capacitators, resistors and the like. These electrical components may serve to provide electrical charge to the one or more earbud (when securely placed in the sheath) and the mobile device (when in the case).

One or more earbud may receive charge through an induction charger placed internally to each of the earbud sheaths. Alternatively, electrical contact points may be provided as described previously to provide an electrical connection for charging the one or more earbud. The mobile device case can receive charge from and external power source through the aperture 9 (not shown). Charging the mobile device case may be accomplished by charging it on its own, or charging the case when the earbuds and/or mobile device (e.g., phone) are in the case. The electrical charge can be received by the mobile device case through a power cord such as a double male cord with a USB type c (USB-C) port, a micro USB or Lightning™ port. Alternatively, power for charging may be received wirelessly through induction by placing the mobile device case within the induction range a charging mat or tray. The battery receiving charge in the mobile device case may be a lithium ion, lithium air battery, or other types of battery known to a person skilled in the art, depending on technical requirements and material availability.

The controller of the mobile device case may be configured (e.g., via the firmware) to provide power management features including the ability to control the prioritization of the electrical charge. There may be a digital or mechanical switch usable to divert charge from the mobile device case to either the earbuds or the mobile device depending on the user's preference. There may also be an option to set a timer to allow the controller of the mobile device case to automatically switch over the priority of the charge after a certain limit of time or percentage charge of the mobile device or earbuds. Additionally, the mobile device case may also provide a neutral setting which would keep the charge stored in the battery pack of the mobile device case rather than passing the charge along to either the attached mobile device or earbuds or both.

To use one or more earbud with the mobile device case for listening to audio provided by the mobile device, the earbud may be wirelessly connected directly to the mobile device through a suitable wireless protocol such as Bluetooth®. Alternatively, the wireless earbud could be connected to the mobile device by a Bluetooth® bridge provided by the mobile device case. In this alternative embodiment, the mobile device (e.g., phone) may be configured to transmit audio signals via its data interface (e.g., USB type c (USB-C) port, micro USB, or Apple™ Lightning™ port) electrically coupled or connected to the mobile device interface 24 of the mobile device case as seen in FIG. 1. The audio signals may be received by the mobile device case over this wired connection and transmit the audio signals using a wireless transceiver (the transceiver being electrically connected to the mobile device via the internal interface over a wired connection) to the earbuds using the using a wireless link such as a Bluetooth® connection established solely between the mobile device case and the earbuds. Enabling the Bluetooth® feature on the mobile device allows transmission of data that can be used for tracking of mobile devices and their users and can also be used as a platform for intruders to gain unauthorized access into the mobile device. The illustrated embodiments, which provides a Bluetooth® bridge, may enhance the security of the information stored on the mobile device by allowing the user to disable the mobile device's Bluetooth® capabilities while using earbuds, preventing tracking and hacking of the mobile device through the Bluetooth® platform. It may be noted that while the protocol discussed herein is Bluetooth®, it may be understood that any other wireless data transmission protocol may similarly be bridged using an appropriately configured mobile device case.

In other embodiments, the mobile device case can be used to bridge a connection with devices that do not have wireless capabilities. For example, some devices do not have Bluetooth® capabilities to support use with wireless earbuds. Such devices may include, but not limited to, laptops, or entertainment systems on airplanes, which may not be able to interact directly with wireless Bluetooth® earbuds. The mobile device case may contain an auxiliary port as discussed previously that provides a bridge connection between a device without wireless or Bluetooth® capabilities and wireless earbuds. Specifically, in this embodiment, the mobile device case may have a female auxiliary jack that can connect to the device without Bluetooth® using an auxiliary cord with a double male auxiliary jack. The mobile device case may connect via the auxiliary cord to the device without Bluetooth® to receive signals such as audio signals over the auxiliary cord. The mobile device case may then retransmit audio signal wirelessly using a wireless transceiver (the transceiver being electrically connected to the device without Bluetooth® through the auxiliary port over a wired connection) over a wireless link such as Bluetooth® to relay the audio signals to the earbuds. While a Bluetooth® link is described in the present embodiment, it may be contemplated that other wireless protocols and data types may be transmitted over this wireless bridge established by the mobile device case to enable data communication between an "auxiliary" device connected to the auxiliary port of the mobile device case and a wireless device.

In another embodiment, the mobile device case may be configured to receive audio signals from the device without Bluetooth® via the auxiliary jack and provide the audio signals to the mobile device for wireless transmission using Bluetooth® to the earbuds. Specifically, in this embodiment, the data interface (e.g., USB type c (USB-C) port, micro USB, or Apple™ Lightning™ port) of the mobile device maybe coupled or connected to the mobile device interface 24 of the mobile device case as seen in FIG. 1. The audio signal received by the mobile device case via the auxiliary jack may be transmitted to the mobile device through the mobile device interface 24. In turn, the audio signals can be relayed wirelessly by the mobile device to the earbuds over a wireless protocol such as Bluetooth®. While the previous embodiments disclose transmission of audio signals, the same principles may be applied for the transmission of data over any suitable wireless protocols supported by the mobile device case, mobile device and accessory device (e.g., earbuds or wireless-enabled devices).

As noted previously, some newer mobile device models do not include an auxiliary jack to plug in wired earphones. In some embodiments, the mobile device case may provide the auxiliary jack for use with wired earphones. Specifically, the mobile device may be configured to transmit audio signals via its data interface (e.g. USB type c (USB-C) port, micro USB, or Apple™ Lightning™ port) coupled or connected to the mobile device interface 24 of the mobile device case as seen in FIG. 1. The audio signals may be received by the mobile device case over this wired connection and the audio signals relayed to the auxiliary jack for transmission to the wired earphones.

In some embodiments, the apparatus may be a mobile device case with the capacity to store the earbuds within the cavity of the device. The earbuds may be stored by means of any of the methods listed previously (friction, magnetism, hinge, and the like).

In some embodiments, the rechargeable battery pack is integrated into the mobile device case. In some embodiments, the rechargeable battery back is removably coupled to the mobile device. In some embodiments, the mobile device case includes a cavity for holding the removably couplable rechargeable battery pack.

The examples and corresponding diagrams used herein are for illustrative purposes only. Different configurations and terminology can be used without departing from the principles expressed herein. For instance, steps, equipment, components, and modules can be added, deleted, modified, or re-arranged without departing from these principles.

Unless the context clearly requires otherwise, throughout the description and the claims: "comprise," "comprising," and the like are to be construed in an inclusive sense, as opposed to an exclusive or exhaustive sense; that is to say, in the sense of "including, but not limited to". "Connected," "coupled," or any variant thereof means any connection or coupling, either direct or indirect, between two or more elements; the coupling or connection between the elements can be physical, logical, or a combination thereof. "Herein," "above," "below," and words of similar import, when used to describe this specification shall refer to this specification as a whole and not to any particular portions of this specification. "Or" in reference to a list of two or more items, covers all of the following interpretations of the word: any of the items in the list, all of the items in the list, and any combination of the items in the list. The singular forms "a," "an," and "the" also include the meaning of any appropriate plural forms.

Where a component is referred to above, unless otherwise indicated, reference to that component should be interpreted as including as equivalents of that component, any component which performs the function of the described component (i.e., that is functionally equivalent), including components which are not structurally equivalent to the disclosed structure which performs the function in the illustrated exemplary implementations of the invention.

Specific examples of systems, methods and apparatuses have been described herein for purposes of illustration. These are only examples. The methods and apparatuses provided herein can be applied to systems and apparatuses other than the examples described above. Many alterations, modifications, additions, omissions and permutations are possible within the practice of this invention. This invention includes variations on described implementations that would be apparent to the skilled addressee, including variations obtained by: replacing features, elements and/or acts with equivalent features, elements and/or acts; mixing and matching of features, elements and/or acts from different implementations; combining features, elements and/or acts from implementations as described herein with features, elements and/or acts of other technology; omitting and/or combining features, elements and/or acts from described implementations.

Although the invention has been described with reference to certain specific embodiments, various modifications thereof will be apparent to those skilled in the art without departing from the spirit and scope of the invention.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

The invention claimed is:

1. A mobile device case for carrying and charging a mobile device and at least one earbud, comprising:
   a main body having:
   a mobile device cavity for receiving a mobile device, and
   at least one earbud cavity for receiving at least one earbud, the earbud cavity including magnetic attraction for securing the at least one earbud within the earbud cavity, the magnetic attraction being reversible by actuation of a control switch that reverses a polarity of a magnetic field source in the earbud cavity for generating a repulsive force against the at least one earbud;
   a rechargeable battery pack in the main body;

a mobile device interface connected to the cavity, the mobile device interface operatively connected to the battery pack and operable to supply power to the mobile device; and at least one earbud interface disposed within the at least one earbud cavity, the earbud interface operatively connected to the battery pack and operable for supplying power to the respective earbud stored in the earbud cavity to charge the earbud.

2. The mobile device case of claim 1, wherein the main body further comprises a plurality of apertures to provide access to interfaces of the mobile device.

3. The mobile device case of claim 1, further comprising a second earbud cavity for securing a second earbud within the second earbud cavity by friction, and which is removable by manual extraction.

4. The mobile device case of claim 1, further comprising a second earbud cavity having a slider mechanism operable for pushing a second earbud into and out of the second earbud cavity and securing the second earbud within the second cavity.

5. The mobile device case of claim 1, further comprising a second earbud cavity having a compressed spring mechanism restrained by a control button for securing a second earbud and releasing the secured second earbud upon actuation of the control button that releases the compressed spring mechanism to a decompressed state.

6. The mobile device case of claim 1, further comprising a protrusion on a back panel for housing the at least one earbud.

7. The mobile device case of claim 1, further comprising a sheath structure having an electromagnet for housing and securing the at least one earbud in the at least one earbud cavity.

8. The mobile device case of claim 1, wherein the at least one earbud cavity is disposed at the base of the main body and the case comprises at least one enclosure extending from the base of the case positionable in an open and closed state to expose and cover the opening of the at least one earbud cavity.

9. The mobile device case of claim 8, wherein the at least one enclosure is attached to the main body with a hinge or by magnetic attraction.

10. The mobile device case of claim 1, wherein the mobile device cavity is defined by a back panel, left panel, right panel, top panel, and a base panel.

11. The mobile device case of claim 10, wherein the at least one earbud cavity is disposed on the back panel the main body.

12. The mobile device case of claim 1, wherein the battery pack supplies power to the mobile device through an electrical connection or through inductive charging.

13. The mobile device case of claim 1, wherein the battery pack supplies power through an electrical connection or through inductive charging for charging the at least one earbud.

14. The mobile device case of claim 1, wherein the main body further comprises an external power interface disposed outside of the cavity operable to receive electrical power from an external power source.

15. The mobile device case of claim 14, wherein the external power interface is electrically or operatively connected to at least one of the mobile device interface, the earbud interface, and the battery pack to supply power to such interface.

16. The mobile device case of claim 15, further comprising at least one switch operable to control distribution of electrical power to at least one of the mobile device interface and the earbud interface for charging the mobile device and at least one earbud.

17. The mobile device case of claim 1, wherein the main body further comprises at least one speaker grill, the speaker grill is configured to cover at least one audio speaker driver integrated into the main body of the phone case.

18. The mobile device case of claim 1, wherein the main body comprises at least two main body portions combinable to form the main body and the two main body portions comprises:

a top portion with a top, top-left, top-right and top-back sidewalls, the sidewalls forming a first section of the top, back, left and right panels of the main body; and a bottom portion with bottom-left, bottom-right, bottom-back and bottom sidewalls, the sidewalls forming a second section of the top, back, left and right panels of the main body, the mobile file being slidable into a partial cavity defined by the bottom portion and the first and second sections combinable to form the main body.

19. The mobile device case of claim 1, wherein the mobile device interface is further operable as a data interface and is operatively connectable to the mobile device for data communication with the mobile device; and the main body further comprises a wireless transceiver electrically connected to the mobile device through the mobile device interface to provide a wireless communication link between an external device and the mobile device case to facilitate data communication between the external device and the mobile device.

20. The mobile device case of claim 19, wherein the wireless transceiver is a Bluetooth transceiver and the external device is a pair of Bluetooth wireless earbuds.

21. The mobile device case of claim 19, wherein the mobile device interface is one of a USB type c interface, a micro USB interface and an Apple™ Lightning™ port.

22. The mobile device case of claim 1, comprising an auxiliary port connectable to an auxiliary device using an auxiliary cord; and a wireless transceiver electrically connected to the auxiliary device through auxiliary port to facilitate data communication between the auxiliary device and a wireless device wirelessly connected to the mobile device case.

23. The mobile device case of claim 22, wherein the wireless transceiver is a Bluetooth transceiver, the wireless device is a pair of Bluetooth wireless earbuds and the auxiliary device is an audio source incapable of providing an audio signal using Bluetooth.

* * * * *